United States Patent
Vouk et al.

(10) Patent No.: US 11,108,544 B2
(45) Date of Patent: Aug. 31, 2021

(54) ON-CHAIN GOVERNANCE OF BLOCKCHAIN

(71) Applicant: International Business Machines Corporation, Armonk, NY (US)

(72) Inventors: Meeta Vouk, Cary, NC (US); Gari Singh, Wilmington, MA (US); Jason K. Yellick, Durham, NC (US); Gennaro A. Cuomo, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 16/025,422

(22) Filed: Jul. 2, 2018

(65) Prior Publication Data
US 2020/0007312 A1    Jan. 2, 2020

(51) Int. Cl.
*H04L 9/06* (2006.01)
*H04L 29/06* (2006.01)
*H04L 29/08* (2006.01)

(52) U.S. Cl.
CPC .......... *H04L 9/0637* (2013.01); *H04L 9/0643* (2013.01); *H04L 63/20* (2013.01); *H04L 67/104* (2013.01); *H04L 2209/38* (2013.01)

(58) Field of Classification Search
CPC ..... H04L 9/0637; H04L 9/0643; H04L 63/20; H04L 67/104; H04L 2209/38; H04L 9/3239; H04L 9/3247; H04L 63/12
See application file for complete search history.

(56) References Cited

U.S. PATENT DOCUMENTS

| | | | |
|---|---|---|---|
| 9,635,000 | B1 | 4/2017 | Muftic |
| 10,057,243 | B1 | 8/2018 | Kumar et al. |
| 10,348,505 | B1 | 7/2019 | Crawforth et al. |
| 10,365,922 | B1 | 7/2019 | Wang et al. |
| 10,756,884 | B2 * | 8/2020 | Vouk ..................... H04L 63/102 |
| 2011/0083064 | A1 | 4/2011 | Kagan et al. |
| 2015/0188945 | A1 | 7/2015 | Kjeldaas |
| 2015/0244690 | A1 | 8/2015 | Mossbarger |
| 2017/0046651 | A1 | 2/2017 | Lin et al. |
| 2017/0048216 | A1 | 2/2017 | Chow et al. |
| 2017/0116693 | A1 | 4/2017 | Rae et al. |

(Continued)

FOREIGN PATENT DOCUMENTS

WO    WO 2018/172439 A1 *    9/2018   ............. G06Q 20/38

OTHER PUBLICATIONS

List of IBM Patents or Patent Applications Treated as Related, Jul. 11, 2018.

(Continued)

*Primary Examiner* — Christopher A Revak

(57) ABSTRACT

An example operation may include one or more of receiving a request to commit a blockchain request to a hash-linked chain of blocks stored on a distributed ledger, extracting governance policies which are encoded within a data block of the hash-linked chain of blocks on the distributed ledger, determining if the blockchain request satisfies the extracted governance policies of the hash-linked chain of blocks on the distributed ledger, and in response to the blockchain request satisfying the extracted governance policies, executing the blockchain request and storing the executed blockchain request within another data block of the hash-linked chain of data blocks on the distributed ledger.

20 Claims, 19 Drawing Sheets

(56) References Cited

U.S. PATENT DOCUMENTS

| | | |
|---|---|---|
| 2017/0195336 A1 | 7/2017 | Ouellette |
| 2017/0236120 A1 | 8/2017 | Herlihy et al. |
| 2017/0344987 A1 | 11/2017 | Davis |
| 2018/0039667 A1 | 2/2018 | Pierce et al. |
| 2018/0218454 A1 | 8/2018 | Simon et al. |
| 2018/0293312 A1 | 10/2018 | Tateossian |
| 2018/0329693 A1 | 11/2018 | Eksten et al. |
| 2018/0359096 A1 | 12/2018 | Ford et al. |
| 2019/0004789 A1 | 1/2019 | Mills |
| 2019/0026656 A1 | 1/2019 | Murdock, IV et al. |
| 2019/0036778 A1* | 1/2019 | Bathen ............... H04L 41/0893 |
| 2019/0036906 A1 | 1/2019 | Biyani et al. |
| 2019/0058696 A1 | 2/2019 | Bowman et al. |
| 2019/0097807 A1 | 3/2019 | Mahanta et al. |
| 2019/0147431 A1 | 5/2019 | Galebach et al. |
| 2019/0182257 A1 | 6/2019 | Lee et al. |
| 2019/0188655 A1 | 6/2019 | Pandit et al. |
| 2019/0207995 A1* | 7/2019 | Gonzales, Jr. ...... G06Q 20/3829 |
| 2019/0236559 A1* | 8/2019 | Padmanabhan ......... G06F 21/64 |
| 2019/0266576 A1 | 8/2019 | McCauley et al. |
| 2019/0268142 A1* | 8/2019 | Leker .................... H04L 63/126 |
| 2019/0303932 A1 | 10/2019 | Klaedtke |
| 2019/0347655 A1 | 11/2019 | Sewell |
| 2019/0347656 A1* | 11/2019 | Lu ....................... G06F 16/1824 |
| 2019/0349426 A1 | 11/2019 | Smith et al. |
| 2019/0372772 A1* | 12/2019 | Novotny ............... H04L 9/3236 |
| 2019/0392118 A1 | 12/2019 | Elden et al. |
| 2020/0007311 A1* | 1/2020 | Oberhofer ............. G06F 21/604 |
| 2020/0007312 A1 | 1/2020 | Vouk et al. |
| 2020/0007314 A1* | 1/2020 | Vouk ....................... H04L 63/12 |
| 2020/0067697 A1* | 2/2020 | Puddu ................. G06F 16/9027 |
| 2020/0074458 A1* | 3/2020 | Govindarajan ....... H04L 9/3247 |
| 2020/0089509 A1* | 3/2020 | Arya ..................... H04L 9/3297 |
| 2020/0092084 A1* | 3/2020 | Maroney ............... H04L 9/0643 |
| 2020/0151350 A1* | 5/2020 | Irazabal ................ H04L 9/0891 |
| 2020/0162473 A1* | 5/2020 | Mercuri ................ H04L 9/3239 |
| 2020/0228342 A1* | 7/2020 | Nixon ................... H04L 9/0637 |

OTHER PUBLICATIONS

Meeta Vouk, On-Chain Governance of Blockchain, U.S. Appl. No. 16/025,342, filed Jul. 2, 2018 (a copy is not provided as this application is available to the Examiner).

Meeta Vouk, On-Chain Governance of Blockchain, U.S. Appl. No. 16/025,489, filed Jul. 2, 2018 (a copy is not provided as this application is available to the Examiner).

Meeta Vouk, On-Chain Governance of Blockchain, U.S. Appl. No. 16/025,535, filed Jul. 2, 2018 (a copy is not provided as this application is available to the Examiner).

Meeta Vouk, On-Chain Governance of Blockchain, U.S. Appl. No. 16/025,578, filed Jul. 2, 2018 (a copy is not provided as this application is available to the Examiner).

A. Paperno, "Teambrella: A Peer-to-Peer Insurance System." https://teambrella.com/WhitePaper.pdf. 2016.

C. Ferris, "HyperLedger Fabric—How to define signature policy for the channel." Oct. 14, 2017.https://stackoverflow.com/questions/46658241/hyperledger-fabric-how-to-define-signature-policy-for-the-channel?rq=1[Accessed Feb. 18, 2018].

E. Androulaki, "Hyperledger Fabric: A Distributed Operating System for Permissioned Blockchains." (Submitted on Jan. 30, 2018) https://arxiv.org/abs/1801.10228.

Hyperledger, Policies in Hyperledger Fabric—hyperledgerfabricdocs master documentation,Feb. 18, 2018.

K. Smith, "Bootstrapping a blockchain network with Orderers and Peers." https://jira.hyperledger.org/browse/FAB-359 [Accessed Feb. 18, 2018].

M. Migliardi, "On the Feasibility of Moderating a Peer-to-Peer CDN System: A Proof-of-Concept Implementation," 2015 10th International Conference on P2P, Parallel, Grid, Cloud and Internet Computing (3PGCIC), Krakow, 2015, pp. 689-694.

S. Somanchi, "Bootstrap feature," https://github.com/hyperledger/fabric-test/blob/master/feature-upgrade/features/bootstrap.feature [Accessed Feb. 18, 2018].

* cited by examiner

FIG. 4C

Blockchain Governance Policies 440

| Policy Name 442 | Value 444 | Reference 446 |
|---|---|---|
| 1. New Member | Data | A12 |
| 2. Block Size | Data | A13 |
| 3. Block Hash | Data | B01 |
| 4. Block Batch Timeout | Data | B11 |
| 5. Merkle Tree Width | Data | A10 |
| 6. Consensus Type | Data | B00 |
| 7. Consensus Parameters | Data | A01 |
| 8. Party Authorities | Data | A00 |
| 9. Changing Governance | Data | C00 |

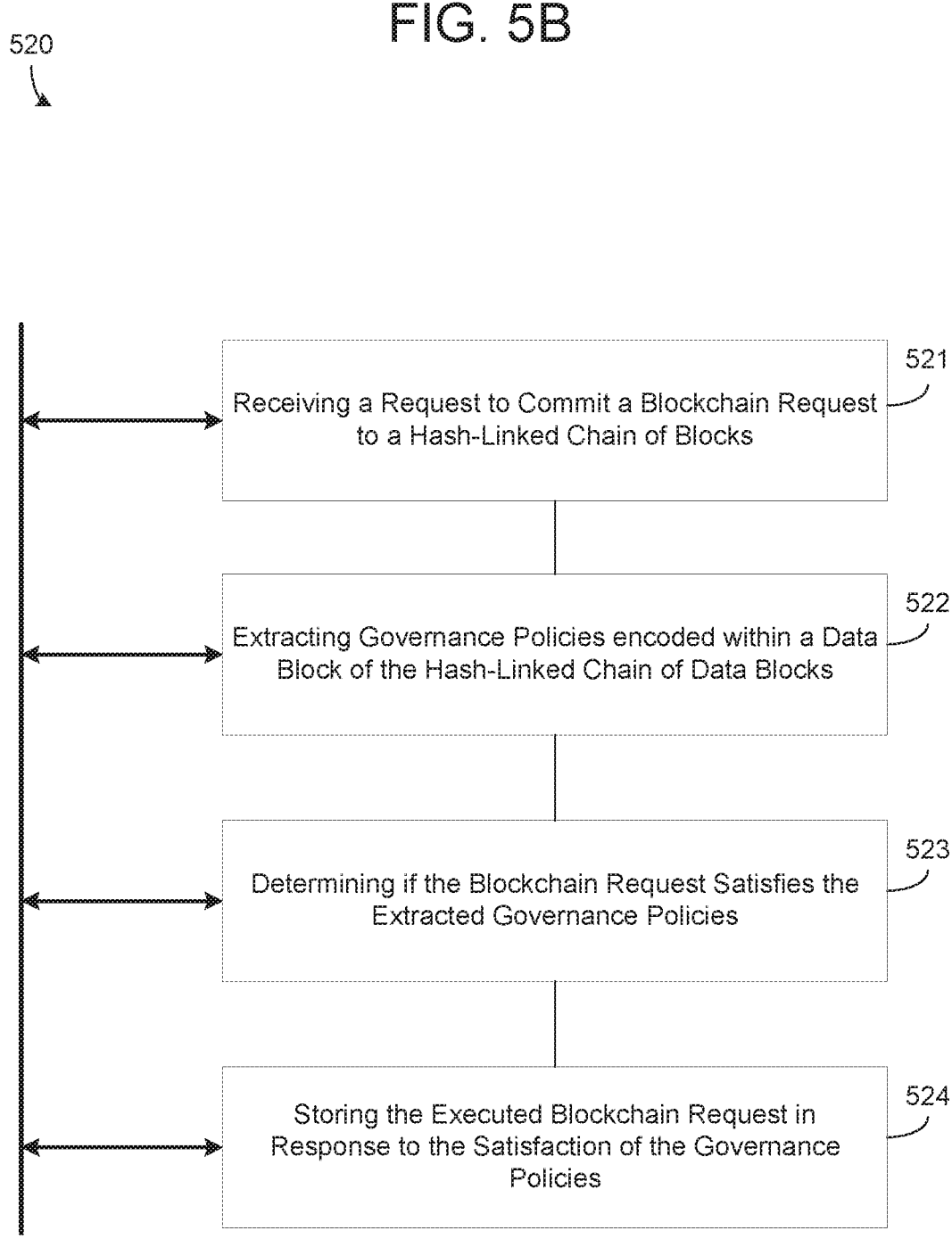

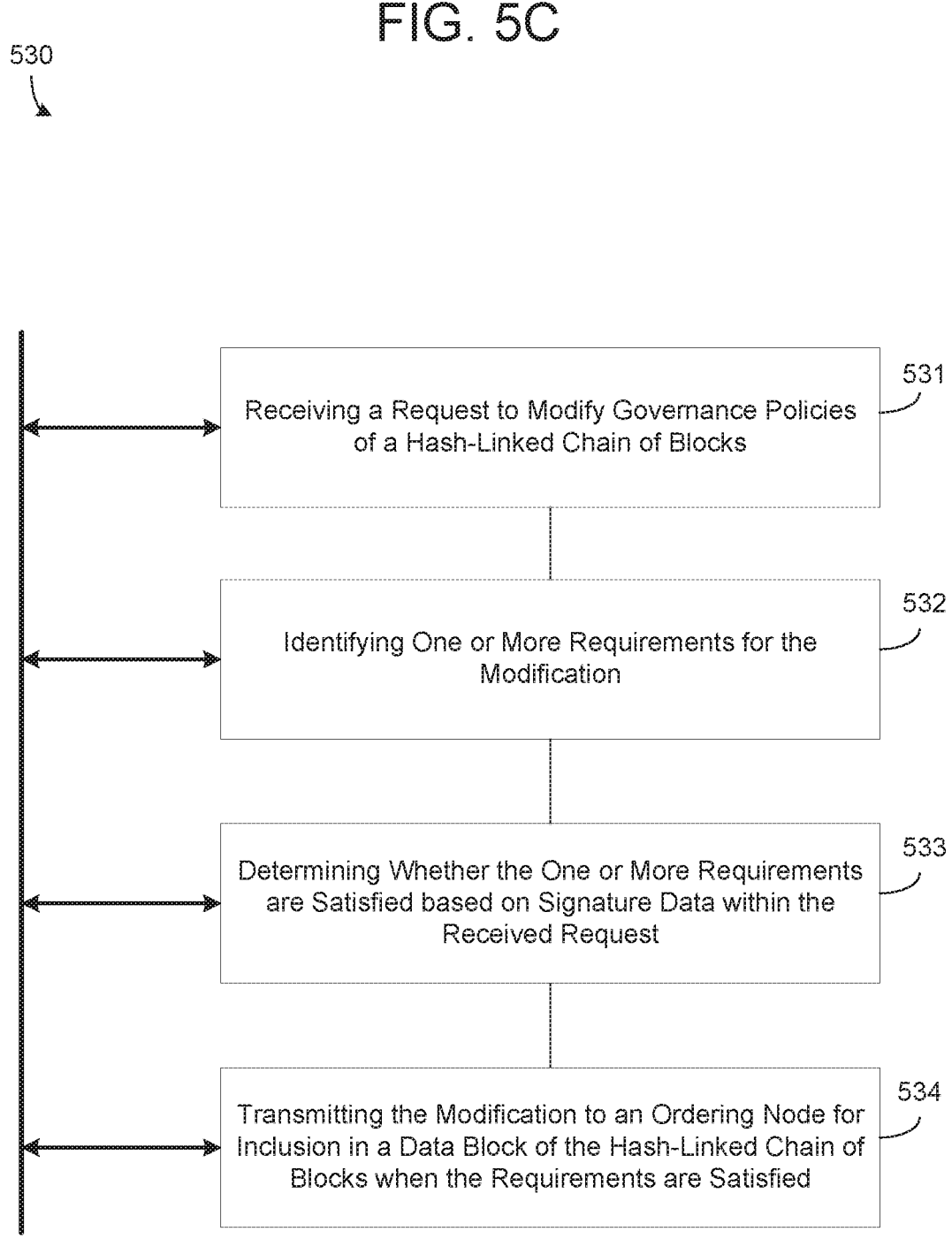

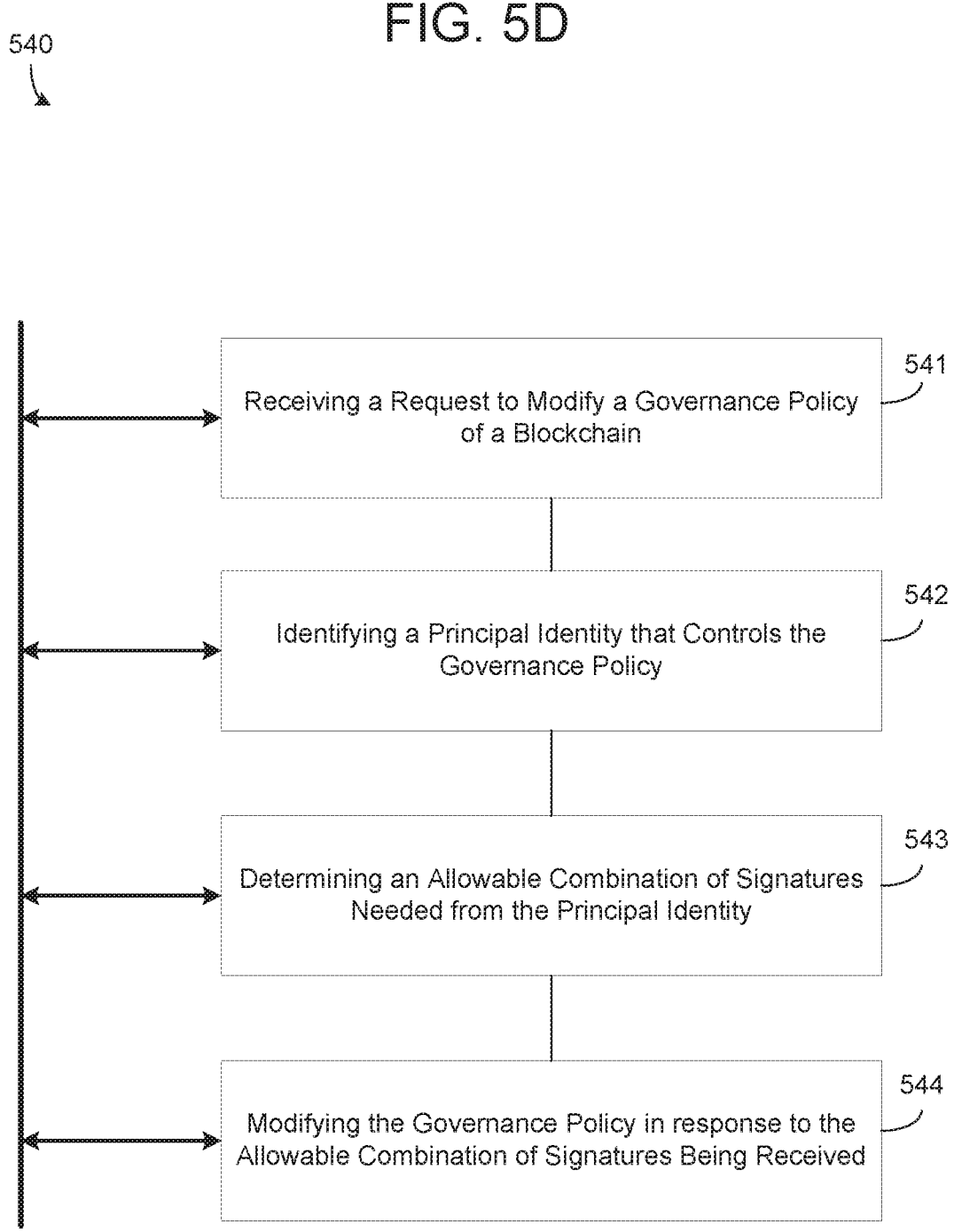

600

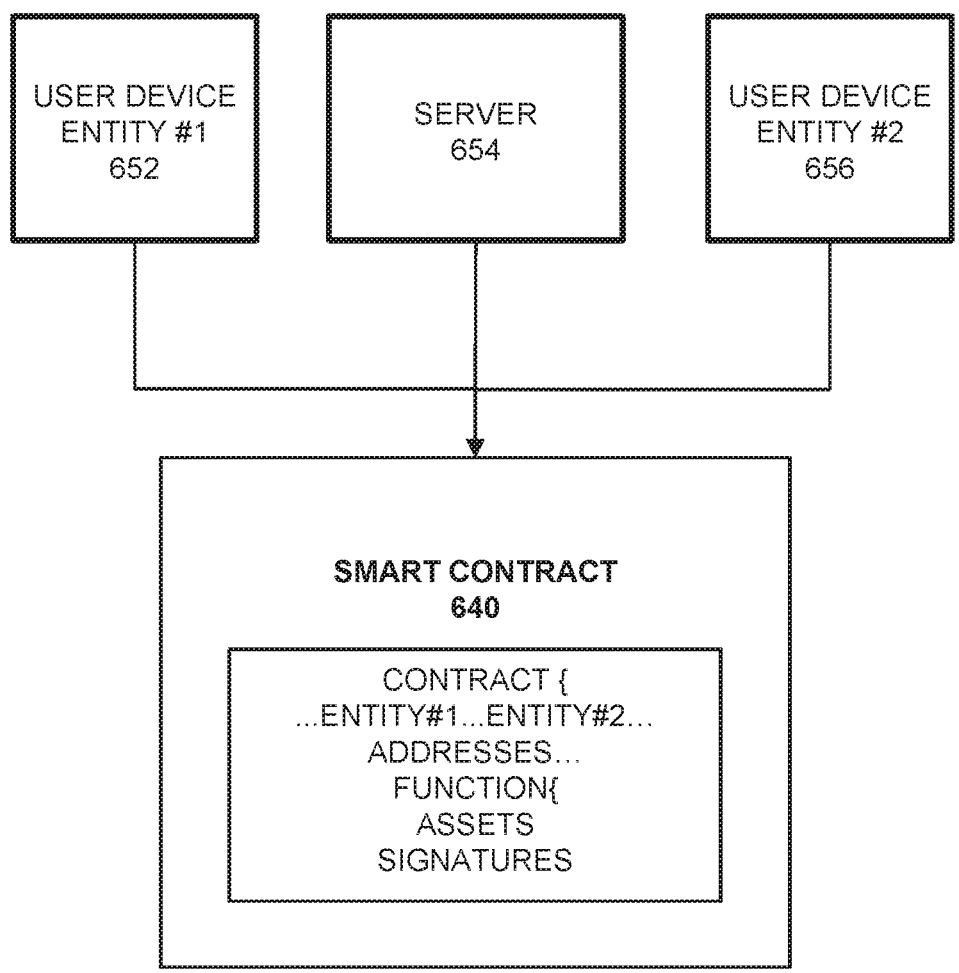

800  FIG. 8
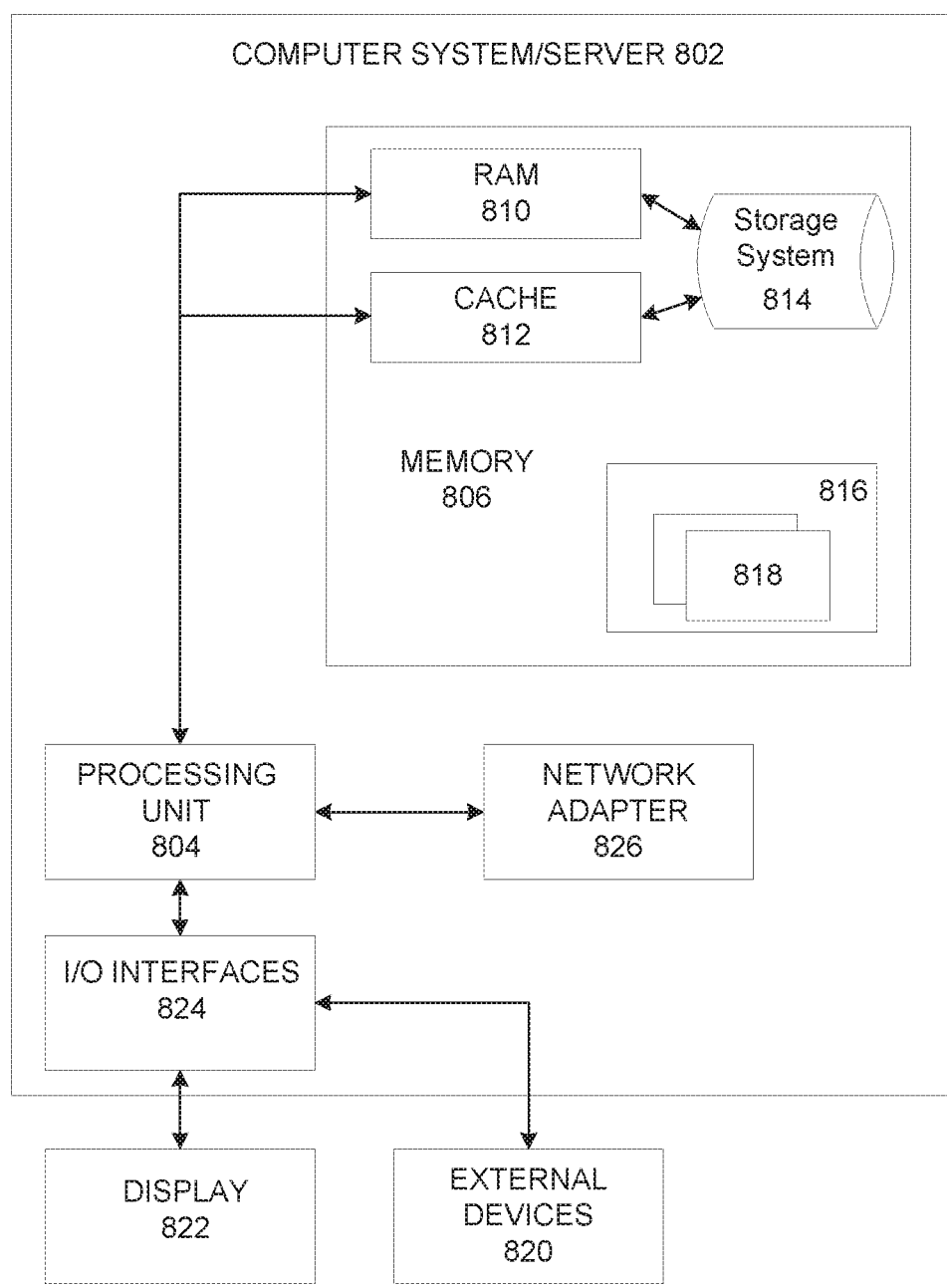

ON-CHAIN GOVERNANCE OF BLOCKCHAIN

TECHNICAL FIELD

This application generally relates to governance policies for a blockchain, and more particularly, to a blockchain in which governance policies for controlling interaction with the blockchain are stored on-chain.

BACKGROUND

Although, primarily used for financial transactions, a blockchain can store various information related to goods and services (i.e., products, packages, statuses, etc.). A decentralized scheme provides authority and trust to a decentralized network and enables its nodes to continuously and sequentially record transactions on a public "block", creating a unique "chain" referred to as a blockchain. Hashing may be used to create an immutable ledger without the need for a central intermediary. The records (e.g., transactions) stored on the blockchain are secured from tampering and revision due to the immutable properties of the blocks storing the transactions. Furthermore, because a blockchain is a distributed system, before adding a block of transactions to a blockchain ledger, peers need to reach a consensus status.

A permissioned blockchain has different organizations with different stakes and authorities all sharing access to a single data structure (the blockchain). Depending on these stakes and authorities, different governance models may be adopted. Governance policies are critical to a blockchain because they formalize mechanisms for creating, updating, and abandoning elements of the blockchain. In particular, the governance rules enable a blockchain network to fix issues as needed. Such fixes can address fraud and hacks, and also ensure that members are satisfied with the system. Conventionally, governance rules are agreed to and managed socially (off-chain). However, the governance rules agreed to off-chain are static, not enforceable by members other than an admin, and they are not modifiable. As such, what is needed is a better way for governing a blockchain.

SUMMARY

One example embodiment may provide a method that includes one or more of receiving a request to commit a blockchain request to a hash-linked chain of blocks stored on a distributed ledger, extracting governance policies which are encoded within a data block of the hash-linked chain of blocks on the distributed ledger, determining if the blockchain request satisfies the extracted governance policies of the hash-linked chain of blocks on the distributed ledger, and in response to the blockchain request satisfying the extracted governance policies, executing the blockchain request and storing the executed blockchain request within another data block of the hash-linked chain of data blocks on the distributed ledger.

Another example embodiment may provide a system that includes one or more of a network interface configured to receive a request to commit a blockchain request to a hash-linked chain of blocks stored on a distributed ledger, and a processor configured to one or more of extract governance policies which are encoded within a data block of the hash-linked chain of blocks on the distributed ledger, determine if the blockchain request satisfies the extracted governance policies of the hash-linked chain of blocks on the distributed ledger, and, in response to successful satisfaction of the extracted governance policies, execute the blockchain request and store the executed blockchain request within another data block of the hash-linked chain of data blocks on the distributed ledger.

A further example embodiment may provide a non-transitory computer readable medium comprising instructions, that when read by a processor, cause the processor to perform one or more of receiving a request to commit a blockchain request to a hash-linked chain of blocks stored on a distributed ledger, extracting governance policies which are encoded within a data block of the hash-linked chain of blocks on the distributed ledger, determining if the blockchain request satisfies the extracted governance policies of the hash-linked chain of blocks on the distributed ledger, and in response to the blockchain request satisfying the extracted governance policies, executing the blockchain request and storing the executed blockchain request within another data block of the hash-linked chain of data blocks on the distributed ledger.

BRIEF DESCRIPTION OF THE DRAWINGS

FIG. 4C is a diagram illustrating governance policy content that may be stored on a blockchain, according to example embodiments.

FIG. 5B is a diagram illustrating a method for verifying a blockchain transaction satisfies on-chain governance policies, according to example embodiments.

FIG. 5C is a diagram illustrating a method of modifying governance information stored on-chain, according to example embodiments.

FIG. 5D is a diagram illustrating a method of determining a signature policy from a recursive data structure, according to example embodiments.

FIG. 6B is a diagram illustrating a smart contract configuration among contracting parties and a mediating server configured to enforce smart contract terms on a blockchain, according to example embodiments.

FIG. 8 is a diagram illustrating an example computer system configured to support one or more of the example embodiments.

DETAILED DESCRIPTION

Figure 1:
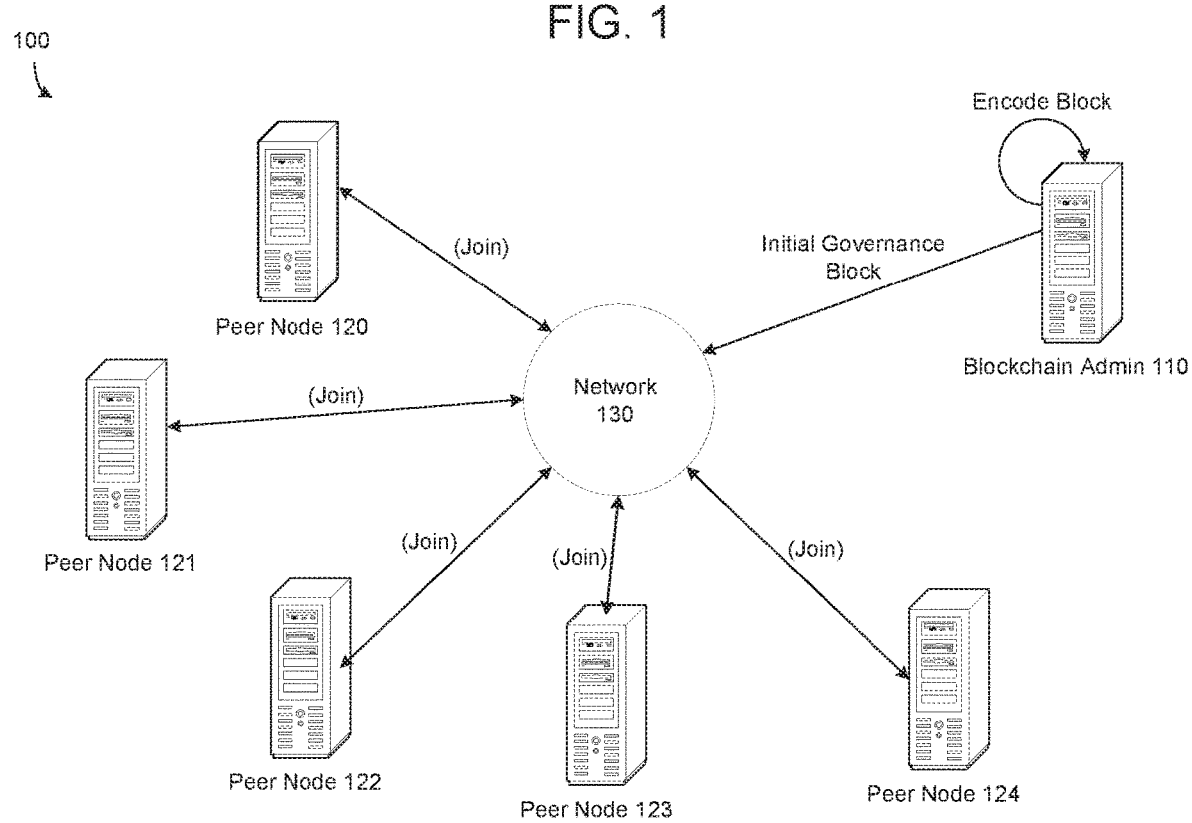
FIG. 1 is a diagram illustrating a blockchain network for managing governance information on-chain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

A blockchain is a distributed system which includes multiple nodes that communicate with each other. The blockchain operates programs referred to as chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. The ordering node is a node running the communication service for all nodes, and which implements a delivery guarantee, such as a broadcast to each of the peer nodes in the system when committing transactions and modifying a world state of the blockchain which identifies current values of the blockchain and may further include control and setup information.

The distributed ledger is a sequenced, tamper-resistant record of all state transitions of a blockchain. State transitions may result from chaincode invocations (e.g., transactions or other requests, etc.) submitted by participating parties (e.g., client nodes, ordering nodes, endorser nodes, peer nodes, etc.) A transaction may result in a set of asset key-value pairs being committed to the ledger as one or more operands, such as creates, updates, deletes, and the like. The ledger includes the blockchain (also referred to as a hash-linked chain) which is used to store an immutable, sequenced record in blocks. The ledger also includes a state database which maintains a current state of the records stored on the blockchain. There is typically one distributed ledger per channel. Each peer node maintains a copy of the distributed ledger for each channel of which they are a member.

A chain is a transaction log which is structured as hash-linked sequence of blocks, and each block may contain a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for keys that are included in the chain transaction log. Because the current state represents the latest key values known to a channel, it is sometimes referred to as the world state. Chaincode invocations execute transactions against the current state data of the distributed ledger. To make these chaincode interactions efficient, the latest values of the keys may be stored in a state database. The state database may be an indexed view into the chain's transaction log that be regenerated from the chain at any time. The state database may automatically be recovered (or generated if needed) upon peer node startup, and before transactions are accepted.

Example embodiments provide methods, systems, non-transitory computer readable media, devices, and/or networks, which provide for management of blockchain governance policies on-chain. In some embodiments, governance policies and policy data are encoded within a data block and stored on a blockchain controlled by the governance policies. The blockchain (and the governance policies) may be stored on a distributed ledger which is distributed (i.e., replicated) across multiple blockchain peer nodes. The example embodiments also provide for mechanisms to modify the governance policies on-chain. For example, a blockchain peer node can propose a change to a governance policy, identify one or more parties which are required to endorse the modification, and solicit signatures from the one or more parties. The modification to the governance policy can be stored within a data block just as a traditional blockchain transaction.

The instant application solves the drawbacks of managing governance off-chain such as rigidity and lack of security by encoding governance rules for the chain into the chain itself (i.e., within a data block), whereas prior governance solutions relied upon external social constructs. For example, the governance policies can be dynamically modified or otherwise adapted based on requests from member nodes of the blockchain. Some of the benefits of such a system include the ability to verify that governance policies are being followed at each stage of the blockchain process, update (add, delete, modify) established governance policies based on signature policies stored on the chain, management of an immutable record of changes to governance policies and the parties that authorized such modifications, and the like. Also, governance policies are no longer rigid rules set in stone off-chain, but can be modified and adapted as members see fit making the governance policy configurable. The present application also provides for determining an amount of trust or trust level of a blockchain based on blockchain data including the governance policies of the blockchain which are encoded therein.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the on-chain management of blockchain governance is implemented due to immutable properties of the blockchain, consensus, endorsement, security, and distributed aspects which are inherent and unique to blockchain. In particular, the blockchain may start with an initial set of governance rules, encoded as policies within a genesis block of the blockchain. Modifications to the governance policies may be performed by collecting endorsements from different stakeholders in the chain until agreement sufficient to satisfy the policies implies consensus from the different parties operating on the blockchain network. Once modified, the blockchain applies the governance changes for any new block stored on the chain. Because changes to the governance is tracked on the chain, it is always possible to identify which members approved the governance action or change in governance.

The example embodiments provide numerous benefits over a traditional database. For example, through the blockchain the embodiments provide for on-chain management and modification to governance policies of the blockchain. Meanwhile, a traditional database could not be used to implement the example embodiments because of the requirement for decentralized agreement. In a traditional database, the controlling entity can modify the governance records without consent of the participants and without record of their modification. This type of unilateral control enables a single entity to determine how to govern the database. In contrast, the blockchain enables decentralized management among differing parties (and often different organizations) on a permissioned blockchain network. Accordingly, the example embodiments provide for a specific solution to a problem the field of blockchain/information systems technology.

The example embodiments also change how data may be stored within a block structure of the blockchain. For example, governance policy information and a recursive data structure identifying signature policies associated with the governance policies may be stored within a data segment of a data block on the blockchain. By storing governance information and signature policy information within data blocks of a blockchain, the governance information and the signature information may be appended to an immutable ledger through a hash-linked chain of blocks. In some embodiments, the data block may be stored on a same chain as other transactions within a traditional block structure. For example, a block may contain both governance information transactions as well as traditional blockchain transactions.

FIG. 1 illustrates a blockchain network 100 for managing governance information on-chain, according to example embodiments. Referring to FIG. 1, the network 100 includes a blockchain admin 110 (e.g., blockchain operator, etc.) and a plurality of peer nodes 120-124 which are connected to each other via a network 130. Here, each of the peer nodes 120-124 may manage and store a blockchain that is shared among the nodes 120-124. Because the blockchain is distributed across the peer nodes 120-124, the peer nodes 120-124 control when and how changes to data stored on the blockchain are made based on agreement among the peer nodes 120-124 rather than relying on a central authority.

According to various embodiments, when the blockchain is initialized by the blockchain admin 110, the blockchain admin 110 may encode governance policies for the blockchain within a data block such as the genesis data block (block 0) of the blockchain. The initial set of governance policies may be agreed to socially, off-chain, but may be stored on-chain through the data block. The blockchain admin 110 may encode the governance policies and other information such as signature policies into a genesis block and distribute the genesis block to the other participants such as peer nodes 120-124.

The peer nodes 120-124 may review the governance policies encoded into the genesis block and either join the chain signaling their agreement to the governance rules, or decide not to join the chain. Once joined, all parties process transactions, including transactions which update the governance policies, according to the rules laid out by the blockchain admin 110 within the governance policy information of the genesis block. When a valid transaction which modifies (or adds to, or deletes part of) the governance policies is subsequently committed to the blockchain, the blockchain (and the network entities) operates under the updated governance rules for all subsequent transactions until a next modification occurs.

The initial governance policy information encoded in the genesis block may include named policies, policy data, a reference to a signature policy which controls modification of the governance policy, and the like. The initial governance policy information may represent the initial governance agreement among the peer nodes 120-124 of the chain which are formalized and made immutable through storage on the immutable blockchain ledger. When a governance policy is mutated or otherwise modified (added, deleted, etc.), the modified policy may be stored in the data section of a new block in the blockchain thereby leaving an immutable record of modifications to the governance policies within the blockchain.

Figure 2A:
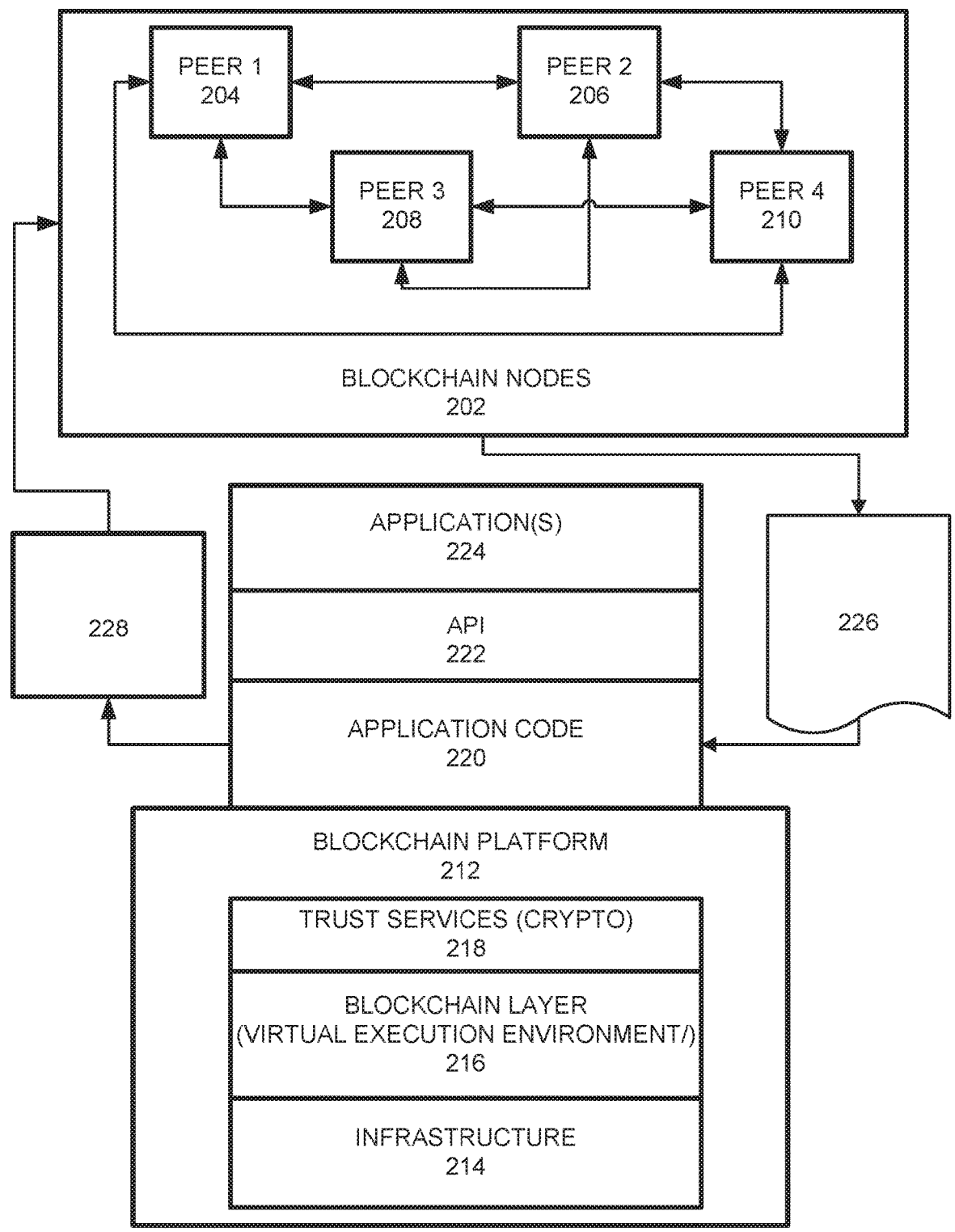
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets and may be operated according to (in obeyance of) governance policies that are stored on the blockchain. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, transaction information 226 may be processed by one or more processing entities (e.g., virtual machines) included in the blockchain layer 216. The transaction result 228 may include modifications to governance policies of the blockchain. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). Smart contracts are created and executed under the governance rules defined within the blockchain. A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, the transaction data 226 may include governance policy data. One function may be to generate a modification to the governance policy data 228, which may be provided to one or more of the nodes 204-210.

Figure 2B:
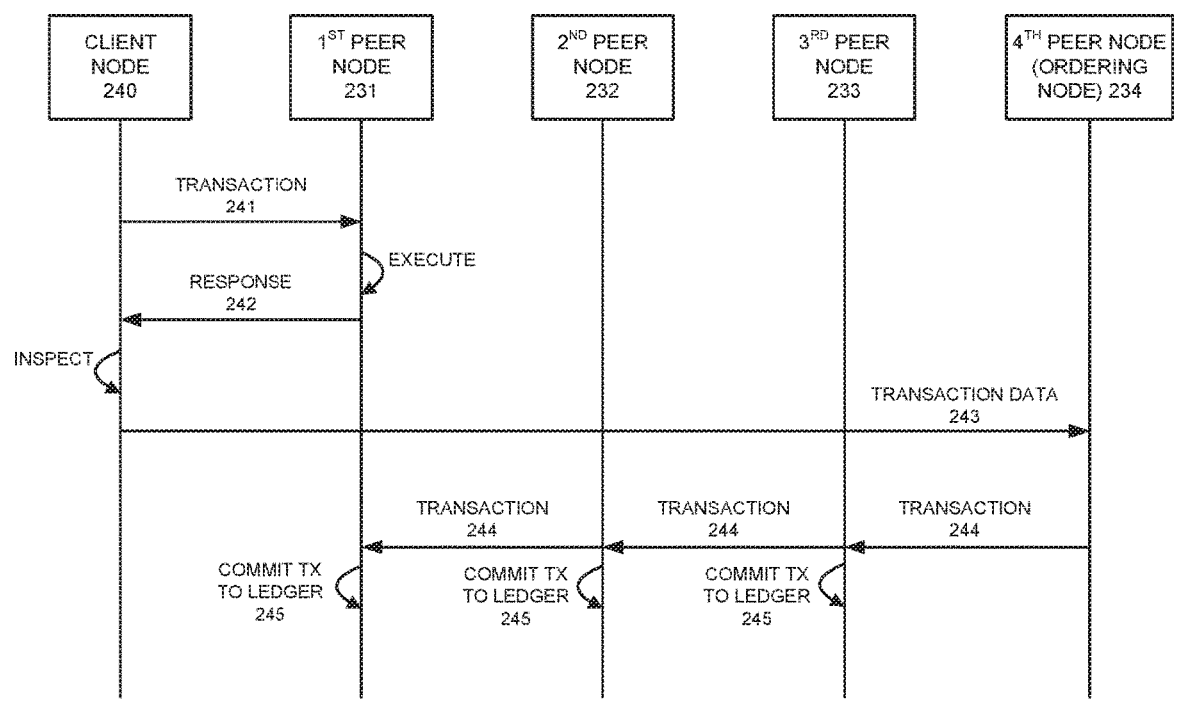
FIG. 2B is a diagram illustrating a transaction flow between peer nodes, according to example embodiments.

FIG. 2B illustrates an example of a transactional flow 230 between nodes of the blockchain in accordance with an example embodiment. Each of the transactions performed in FIG. 2B may be governed by (and obey) governance policies which are stored within a data block of the blockchain. Referring to FIG. 2B, the transaction flow may include a transaction proposal 241 sent by an application client node 240 to an endorsing peer node 231. The endorsing peer 231 may verify the client signature and execute a chaincode function to initiate the transaction. The output may include the chaincode results, a set of key/value versions that were read in the chaincode (read set), and the set of keys/values that were written in chaincode (write set). The proposal response 242 is sent back to the client 240 along with an endorsement signature, if approved.

The client 240 assembles the endorsements into a transaction payload 243 and broadcasts it to an ordering service node 234. The ordering service node 234 then delivers ordered transactions as blocks to all peers 231-233 on a channel. Before committal to the blockchain, each peer 231-233 may validate the transaction and also verify the governance policies are satisfied. For example, the peers 231-233 may check the endorsement policy to ensure that the correct allotment of the specified peers have signed the results and authenticated the signatures against the transaction payload 243. As another example, the peers may determine whether the transaction satisfies governance policies stored on-chain where the block is to be committed.

Referring again to FIG. 2B, the client node 240 initiates the transaction 241 by constructing and sending a request to the peer node 231, which is an endorser. The client 240 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 231 may verify (a) that the transaction proposal is well formed, (b) the transaction has not been submitted already in the past (replay-attack protection), (c) the signature is valid, and (d) that the submitter (client 240, in the example) is properly authorized to perform the proposed operation on that channel. The endorsing peer node 231 may take the transaction proposal inputs as arguments to the invoked chaincode function. The chaincode is then executed against a current state database to produce transaction results including a response value, read set, and write set. However, no updates are made to the ledger at this point. In 242, the set of values, along with the endorsing peer node's 231 signature is passed back as a proposal response 242 to the SDK of the client 240 which parses the payload for the application to consume.

In response, the application of the client 240 inspects/verifies the endorsing peers signatures and compares the proposal responses to determine if the proposal response is the same. If the chaincode only queried the ledger, the application would inspect the query response and would typically not submit the transaction to the ordering node service 234. If the client application intends to submit the transaction to the ordering node service 234 to update the ledger, the application determines if the specified endorsement policy has been fulfilled before submitting the transaction (i.e., did all peer nodes necessary for the transaction endorse the transaction). In this example, the client 240 may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 243 the client 240 assembles endorsements into a transaction and broadcasts the transaction proposal and response within a transaction message to the ordering node 234. The transaction may contain the read/write sets, the endorsing peers signatures and a channel ID. The ordering node 234 does not need to inspect the entire content of a transaction in order to perform its operation, instead the ordering node 234 may simply receive transactions from all channels in the network, order them chronologically by channel, and create blocks of transactions per channel.

The blocks of the transaction are delivered from the ordering node 234 to all peer nodes 231-233 on the channel. The transactions 244 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 245 each peer node 231-233 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 2C:
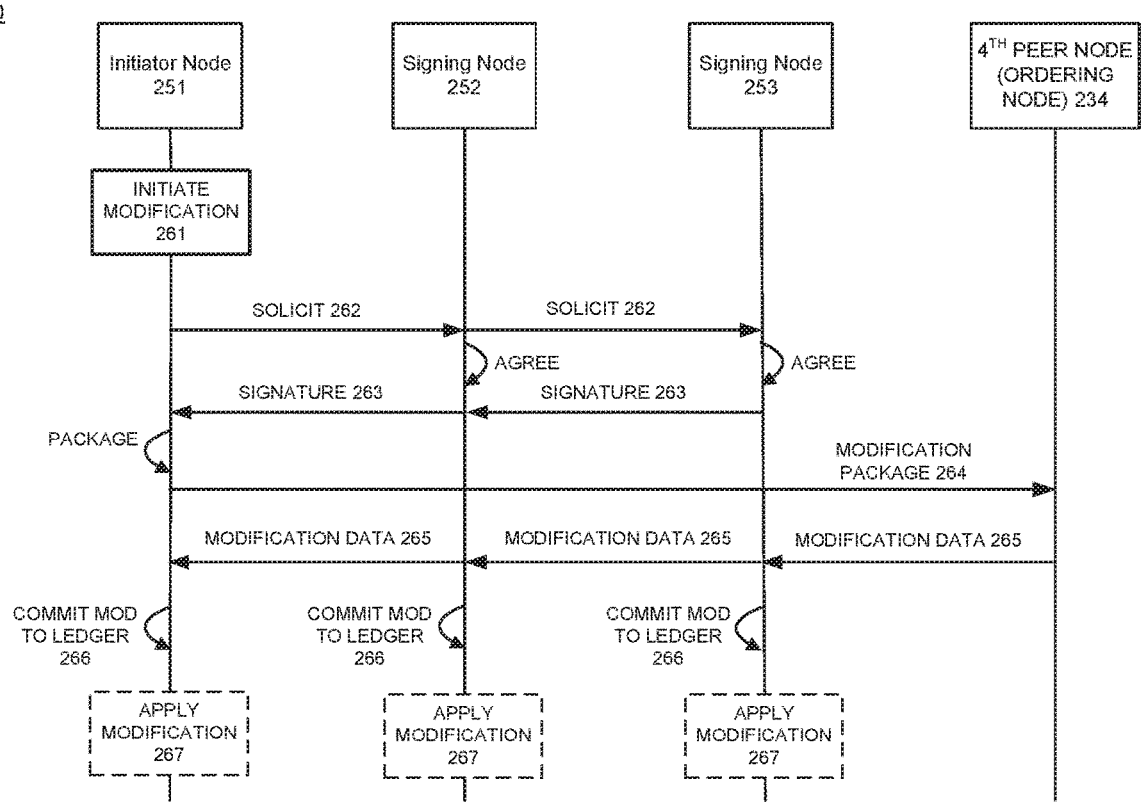
FIG. 2C is a diagram illustrating a governance policy modification flow between peer nodes, according to example embodiments.

FIG. 2C illustrates a governance policy modification flow 250 between peer nodes, according to example embodiments. Referring to the example of FIG. 2C, in 261, an initiator node 251 (e.g., blockchain peer node) may determine or otherwise receive a request to change a governance policy established for a blockchain to which the initiator node 251 is a member. After an initial bootstrap of the governance policies is performed by storing the initial governance policies to a genesis block of the blockchain, the governance policies may be modified (i.e., changed, added, deleted, etc.). The initiator node 251 that wishes to modify the governance policy identifies the aspects of the governance configuration which the initiator node 251 wishes to modify from the previously stored governance information stored on the blockchain. Each element to be modified has an associated governing 'modification policy' which indicates the conditions for agreement which must be satisfied to modify that element.

The initiator node 251 may identify a node (or combination of nodes) that are members of the blockchain that must endorse the modification before the modification can be implemented by the blockchain. As a non-limiting example, when a modification to a governance policy requires more than 50% agreement from peer nodes that are members of a blockchain, then differing combinations of peer nodes may satisfy the modification policy as long as more than half of the peer nodes agree.

The necessary signers or combination of signers may be identified from the already established governance policies which are stored on the blockchain. For example, the governance policies may be stored in a block on the blockchain, and each may include a reference to a principal or other entity that is needed to approve of a modification to a governance policy. The principal may represent a group of nodes/users, a specific user, and the like. The reference may be used to identify a node within a recursive data structure corresponding to the principal and storing signature information (i.e., a signature policy) for modifying each of the governance policies. Each governance policy may require different signers or a different combination of signers. In some embodiments, the recursive data structure may be hierarchical and may be recursive in that nodes representing principals and their signature policies that are positioned higher in the graph (i.e., closer to the root node) require a greater amount of agreement than nodes lower in the graph. An example of the recursive data structure is shown in FIG. 4D.

In the example of FIG. 2C, the initiator node 251 determines that signing node 252 and signing node 253 are required to endorse the modification to the governance policy. In 262, the initiator 251 solicits agreement (signatures) to the set of modifications from the signing nodes 252 and 253 which are required to satisfy the modification policies. In 263, the initiator node receives the requested signatures from the signing nodes 252 and 253 thereby endorsing the change to the governance policies. Once a sufficient set of signatures has been collected which satisfies the modification policy, the initiator 251 packages them together along with the proposed modifications and submits the transaction to an ordering node 254, in 264. The ordering node 254 may store the modification transaction within a data block containing one or more other transactions (traditional, modifications, etc.) and broadcast the new data block to the peer nodes of the blockchain network, in 265. Furthermore, in 266, the peer nodes that receive the data block including the modification to the governance policies verify that the transaction is valid (contains sufficient signatures according to the governance policies) and if so, commits it. The modified governance configuration applied throughout the blockchain network in 267. Accordingly, all subsequent transactions on the blockchain will be stored and managed according to the modified governance policies.

Figure 3:
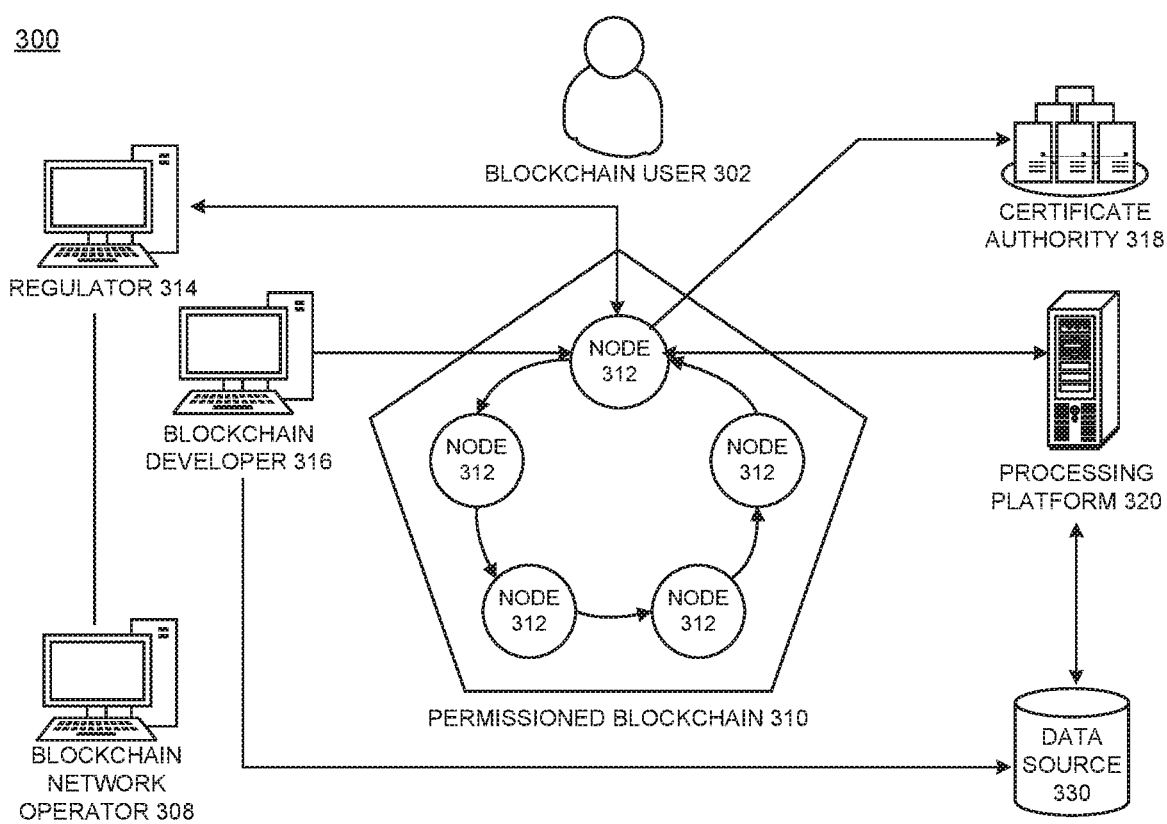
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, query, or the like, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator may 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320. In some embodiments, a peer node 312 may also submit a modification to governance policies of the blockchain. The modification may be submitted by an entity controlling the peer node 312 or by a blockchain user accessing the peer node 312.

According to various embodiments, governance of permissioned blockchain networks is a key feature requirement ensuring that blockchain based networks are a success. The participants of a blockchain network need the ability to define rules that govern the network and collect signatures on agreement of the policies for the network. For instance, the participants of the blockchain may want to implement a policy that 50% of the members have to vote to add more members or remove members. As another example, 60% of members must have to agree before a change in endorsement policy is approved. The example embodiments provide an ability to clearly express governance policies within a blockchain and enforce the policies after required signatures for endorsement have been collected.

Figure 4A:
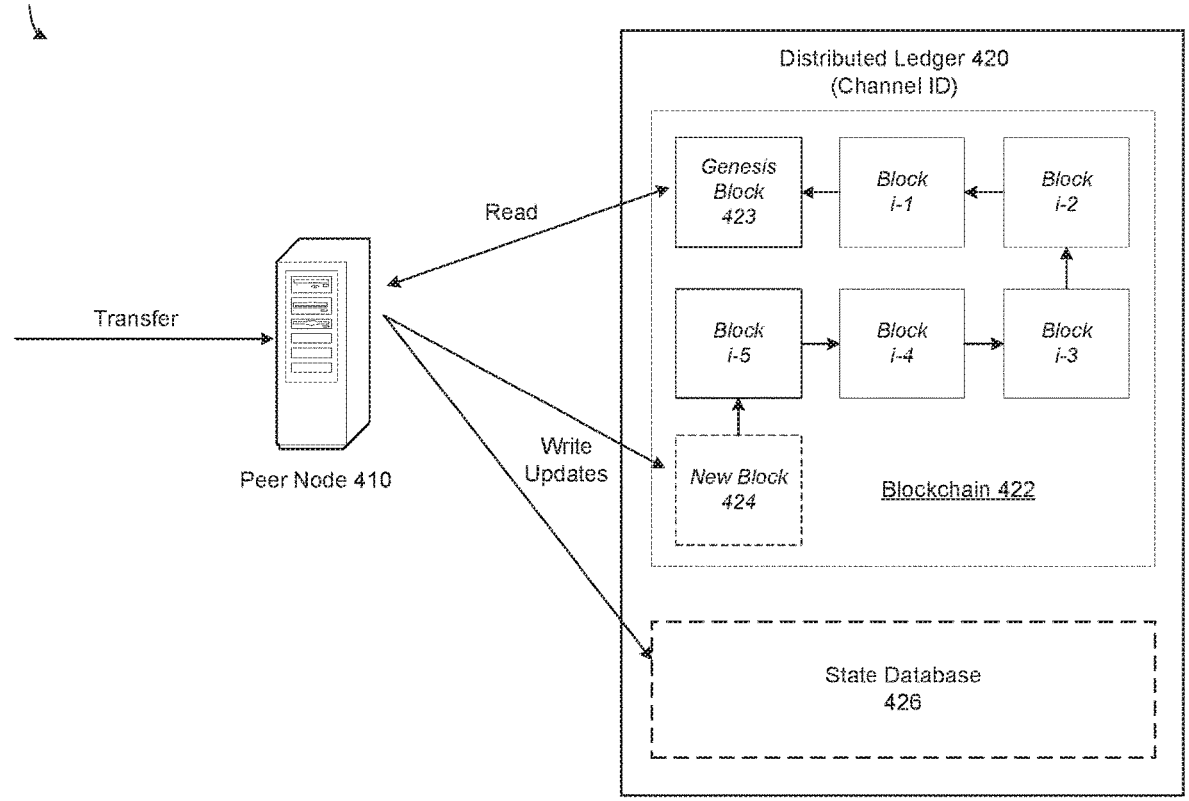
FIG. 4A is a diagram illustrating a process of storing governance policies within a blockchain, according to example embodiments.
Figure 4B:
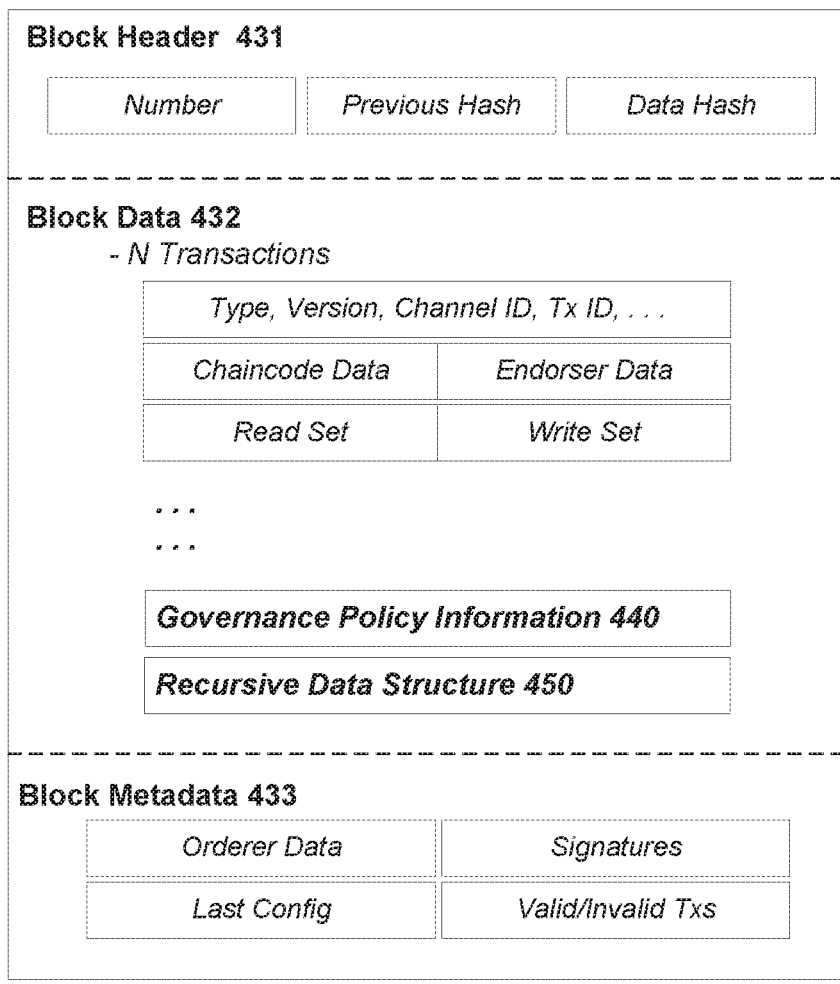
FIG. 4B is a diagram illustrating data block content including governance policy information, according to example embodiments.
Figure 4D:
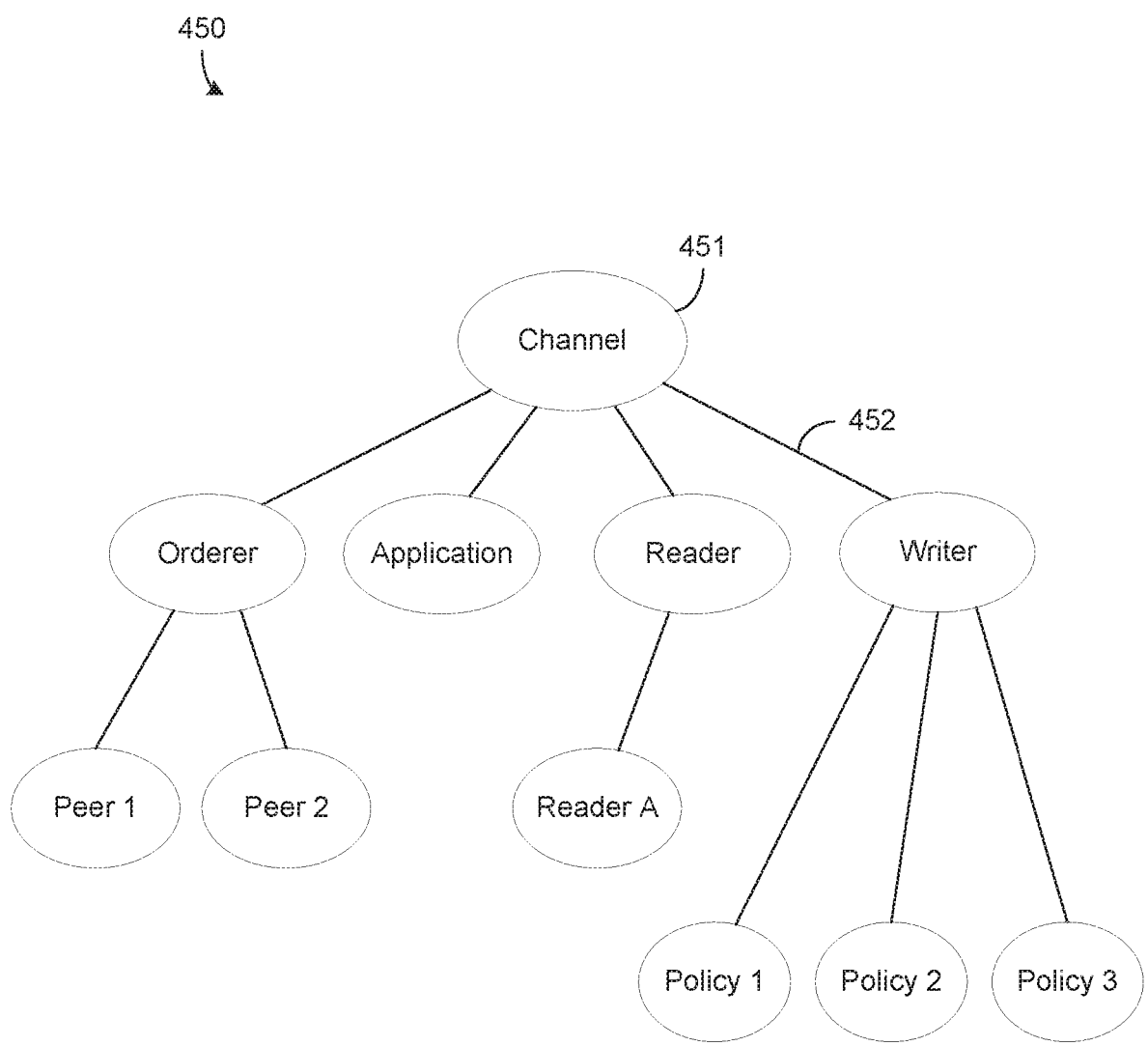
FIG. 4D is a diagram illustrating a recursive data structure storing signature policy data for governing a blockchain, according to example embodiments.

FIG. 4A illustrates a process 400 of a new block storing governance policy information being added to a distributed ledger 420, according to example embodiments, and FIG. 4B illustrates contents of a block structure 430 for blockchain including governance information for the blockchain, according to example embodiments. Referring to FIG. 4A, an ordering node (not shown) may submit a request to modify previously established governance policies for a blockchain 422 stored on the distributed ledger 420. Here, the modification request may be received by a blockchain peer node 410 that is a member of the blockchain 422. Initial governance policy information may be stored within a genesis block 423 of the blockchain 422. Meanwhile, modifications to the governance policies (e.g., additions, deletions, mutations, etc.) may be stored in subsequent blocks 424 of the blockchain 422 as a transaction. The blockchain peer node 410 can read the initial governance policy information from the genesis block 423, and also commit modified governance policy information to a subsequent data block 424 as transactions. In this example, the data block 424 may also include traditional blockchain transactions within the same block.

In addition to the blockchain 422, the blockchain peer node 410 may also maintain a current state of the assets of the blockchain 422 and the blockchain network via the state database 426 which is stored on the distributed ledger 420. It should be appreciated that different types of blockchain nodes/peers may be present in the blockchain network including endorsing peers which simulate and endorse transactions proposed by clients and committing peers which verify endorsements, validate transactions, and commit transactions to the distributed ledger 420. In this example, the blockchain peer node 410 may perform the role of endorser node, committer node, or both.

The distributed ledger 420 includes the blockchain 422 which stores immutable, sequenced records in blocks, and the state database 426 (current world state) maintaining a current state of the blockchain 422. One distributed ledger 420 may exist per channel and each peer may maintain its own copy of the distributed ledger 420 for each channel of which they are a member. The blockchain 422 is a transaction log, structured as hash-linked blocks where each block contains a sequence of N transactions. Blocks may include various components such as shown in FIG. 4B. The linking of the blocks (shown by arrows in FIG. 4A) may be generated by adding a hash of a prior block's header within a block header of a current block. In this way, all transactions on the blockchain 422 are sequenced and cryptographically linked together preventing tampering with blockchain data without breaking the hash links. Furthermore, because of the links, the latest block in the blockchain 422 represents every transaction that has come before it. The blockchain 422 may be stored on a peer file system (local or attached storage), which supports an append-only blockchain workload.

The current state of the blockchain 422 and the distributed ledger 420 may be stored in the state database 426. Here, the current state data represents the latest values for all keys ever included in the chain transaction log of the blockchain 422. In some embodiments, the state database 426 may also store the most current listing of governance policies for the blockchain 422 as well as the entities that signed/endorsed the governance policies. Chaincode invocations execute transactions against the current state in the state database 426. To make these chaincode interactions extremely efficient, the latest values of all keys are stored in the state database 426. The state database 426 may include an indexed view into the transaction log of the blockchain 422, and therefore can be regenerated from the chain at any time.

The state database 426 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals and which are designed and executed in accordance with the governance policy information that is stored on-chain. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service (not shown).

The ordering service accepts endorsed transactions, orders them into a block, and delivers the blocks to the committing peers such as blockchain peer node 410. For example, the ordering service may initiate a new block when a threshold of transactions has been reached, a timer times out, or another condition. In some embodiments, the new block may include modifications to previously established governance policies which are stored on-chain. In this example, the modification may include a change to initial governance policies stored at genesis block 423 which are subsequently recorded at data block 424.

In some embodiments, the ordering service may be made up of a cluster of orderers. The ordering service does not process transactions, smart contracts, or maintain the shared ledger. Rather, the ordering service may accept the endorsed transactions and specify the order in which those transactions are committed to the blockchain 422 on the distributed ledger 420. The architecture of the blockchain network may be designed such that the specific implementation of 'ordering' (e.g., Solo, Kafka, BFT, etc.) becomes a pluggable component. Transactions may be written to the blockchain 422 in a consistent order. The order of transactions is established to ensure that the updates to the state database 426 are valid when they are committed to the network. Unlike a cryptocurrency blockchain system (e.g., Bitcoin, etc.) where ordering occurs through the solving of a cryptographic puzzle, or mining, in this example the parties of the distributed ledger 420 may choose the ordering mechanism that best suits that network.

When the ordering service initializes a new block 424, the new block 424 may be broadcast to committing peers (e.g., blockchain peer node 410, etc.) In response, each committing peer validates the transaction within the new block 424 by checking to make sure that the read set and the write set still match the current world state in the state database 426 and that the data block 424 satisfies the governance policies which are stored on-chain. In some examples, the committing peer can determine whether the read data that existed when the endorsers simulated the transaction is identical to the current world state in the state database 426 including the governance information. When the blockchain peer node 410 validates the transactions in the new block 424, the transaction information is written to the blockchain 422 on the distributed ledger 420, and the state database 426 is updated with the write data from the read-write set. If a transaction fails, that is, if the blockchain node peer 410 finds that the read-write set does not match the current world state in the state database 426, the transaction ordered into a block will still be included in that block, but it will be marked as invalid, and the state database 426 will not be updated.

Referring to FIG. 4B, a block 430 (also referred to as a data block) that is stored on the blockchain 422 of the distributed ledger 420 may include multiple data segments such as a block header 431, block data 432, and block metadata 433. It should be appreciated that the various depicted blocks and their contents, such as block 430 and its contents shown in FIG. 4B are merely for purposes of example and are not meant to limit the scope of the example embodiments. In some cases, both the block header 431 and the block metadata 433 may be smaller than the block data 432 which stores transaction data, however this is not a requirement. The block 430 may store transactional information of N transactions (e.g., 100, 500, 1000, 2000, 3000, etc.) within the block data 432. The block 430 may also include a link to a previous block (e.g., on the blockchain 422 in FIG. 4A) within the block header 431. In particular, the block header 431 may include a hash of a previous block's header. The block header 431 may also include a unique block number, a hash of the block data 432 of the current block 430, and the like. The block number of the block 430 may be unique and assigned in an incremental/sequential order starting from zero. The first block in the blockchain may be referred to as the genesis block 423 which includes information about the blockchain, its members, the data stored therein, etc.

The block data 432 may store transactional information of each transaction that is recorded within the block 430. For example, the transaction data may include one or more of a type of the transaction, a version, a timestamp, a channel ID of the distributed ledger 420, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 432 may also store governance policy information 440 and recursive data structure information 450 identifying signature policy information for changing the governance policy information 440 which adds additional information to the hash-linked chain of blocks in the blockchain 422. Accordingly, the governance policy information 440 and recursive data structure information 450 can be stored in an immutable log of blocks on the distributed ledger 420. Some of the benefits of storing governance policy information 440 and recursive data structure information 450 provides for dynamic on-chain management of governance policies of a blockchain. Accordingly, member nodes of the blockchain can dynamically change and adapt governance policies in a secure and distributed way through the blockchain 422.

The block metadata 433 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service. Meanwhile, a committer of the block (such as blockchain peer node 410)

may add validity/invalidity information based on an endorsement policy, verification of read/write sets, and the like. The transaction filter may include a byte array of a size equal to the number of transactions in the block data 432 and a validation code identifying whether a transaction was valid/invalid.

All parties processing the blockchain are responsible for enforcing that changes to the governance model that are authorized under the current governance. Changes to governance are performed as a transaction, and therefore do not need to be detected. During transaction processing, a configuration update transaction informs the processor that this transaction modifies governance rules. The processor then builds a set of the changes to the governance proposed by the update, compiles the set of policies which must be satisfied to authorize this change, and then evaluates that the set of signatures endorsing the proposed update satisfies each of the policies in that set. Because this evaluation is deterministic, all processors will reach the same conclusion as to whether the governance update is valid or invalid, and apply, or not apply the new governance respectively.

A peer or node which disobeys the governance policy will have an inconsistent state with the rest of the network. Because its state is inconsistent, it will generally not be able to craft valid transactions or otherwise participate meaningfully in the blockchain network. Like many other byzantine fault tolerant systems, the guarantee is that all honest nodes agree.

FIG. 4C illustrates a non-limiting example of governance policy content 440 that may be stored on a blockchain, according to example embodiments. Referring to FIG. 4C, the governance policy information may govern interactions among nodes, the blockchain, the network, and the like. Here, each governance policy may include a policy name 442, a policy value 444, and a reference 446 which identifies a location of a signature policy for modifying the governance policy. The reference 446 may include an identification of where on the recursive data structure 450 the signature policy for modifying the governance policy is stored. The content of the policy name 442, the value 444, and/or the reference 446 may be encoded before being stored on the blockchain to prevent unauthorized access.

Examples of types of governance policies include, but are not limited to a policy for adding a new member to the blockchain, a block size of blocks stored on the blockchain, a block hash algorithm used for hashing block content stored on the blockchain, a block batch timeout period, a Merkle tree width, a consensus type for approving/endorsing a transaction to be stored on the blockchain, consensus parameters (e.g., network locations of endorsing peers, etc.), authorities and/or roles of each party on the blockchain, policies for changing the governance policies (i.e., adding, deleting policies), and the like. It should be appreciated that all types of governance policies that are known or become known may be stored on the blockchain as described herein, and are not to be limited by the example shown in FIG. 4C.

FIG. 4D illustrates a non-limiting example of a recursive data structure 450 storing signature policy data for governing a blockchain, according to example embodiments. Referring to FIG. 4D, the recursive data structure 450 may include a hierarchical graph in which nodes 451 are connected by links 452 to identify relationships between principal entities (or identity) represented by the nodes. A principal entity may include a sub-group of nodes, a particular node, an entire channel, certain roles within the blockchain (i.e., reader, writer, orderer, endorser, etc.), and the like.

Any entity with knowledge of the current governance configuration and authority to transact on the blockchain may propose a change in governance. This entity must collect signatures, either out of band, or facilitated by an application on the blockchain, from those parties which have authority granted by the current governance policies to contribute a valid signature to the proposed update. The signature information may be obtained from the recursive data structure 450. These parties may choose to agree (by contributing a signature) or disagree (by refusing to sign) depending on the proposed change.

The example embodiments define a way to govern a blockchain network. The system provides a mechanism to express governance policies that are needed to govern the blockchain based business networks. In addition, the system also provides the recursive data structure 450 which stores information about signature policies which are required to change (mutate) the governance policies. The signature policies are self-contained rules, defined by the recursive data structure 450. The signature policy defines a list of identities as principals, where a principal may define a literal identity (such a certificate), a role (such as member, or admin), or an organization unit. The signature policy then defines allowable combinations of signatures satisfying these principals via a recursive structure. This recursive structure allows for policies of arbitrary depth and complexity, supporting the "N out Of" operator (a superset of the "AND" and "OR" operators).

In the example of FIG. 4D, signature polices that are stored higher in the data structure 450 that are closer to the root node (channel) may require greater agreement (e.g., a higher percentage) than signature polices which are stored lower in the data structure 450 and closer to the leaf nodes. For example, a child policy may require a subset of signatures that are required by a parent policy in the data structure 450, however, embodiments are not limited thereto. Because the parent policy may require all of the signatures needed for the child policy, the parent policy may be recursive with respect to the child policy. The signature policies may be identified from a reference element that is stored within the governance policy information on the blockchain. Therefore, a node can quickly ascertain where in the data structure 450 a signature policy for a governance policy exists.

Figure 5A:
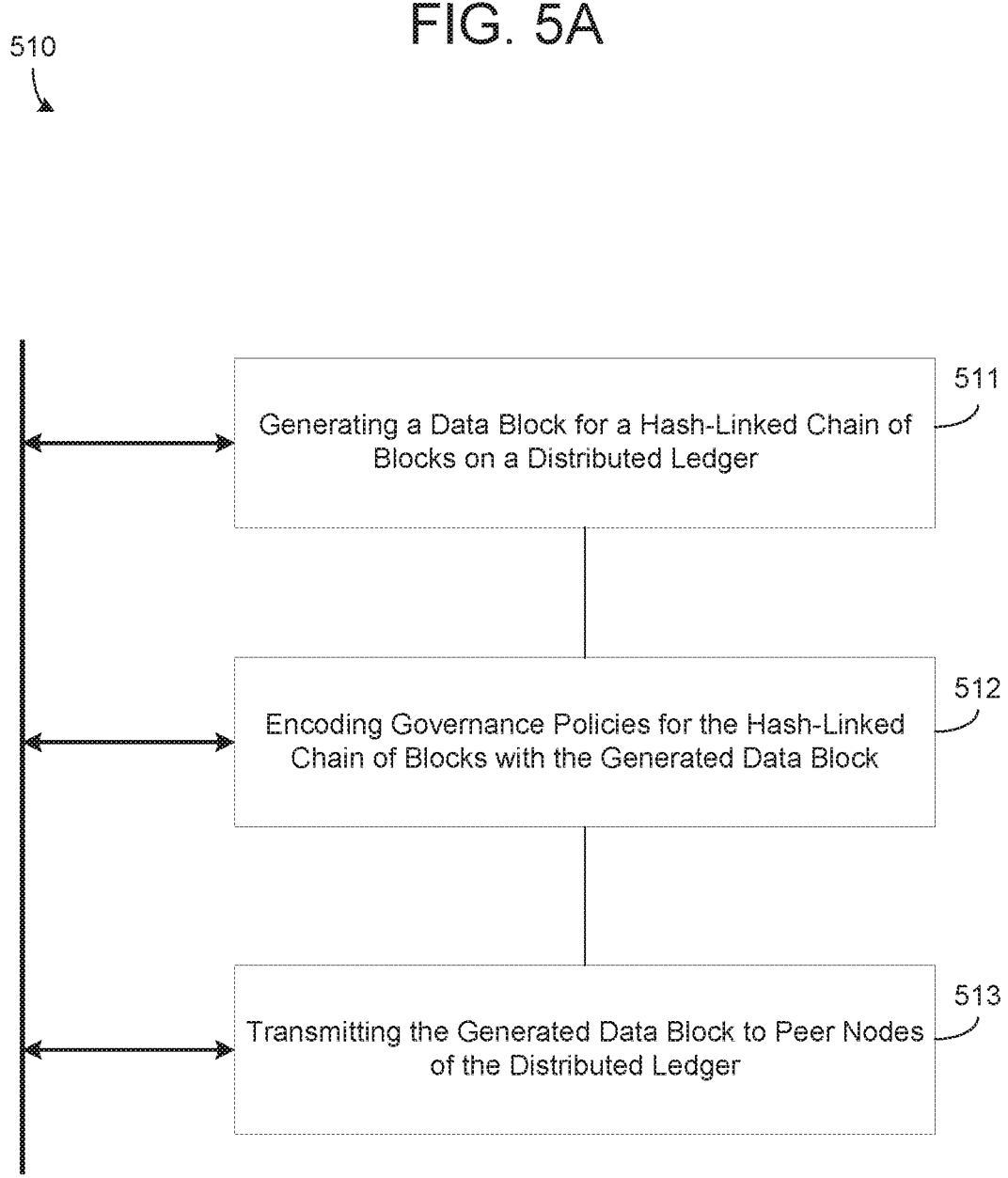
FIG. 5A is a diagram illustrating a method of encoding and storing governance information on-chain, according to example embodiments.

FIG. 5A illustrates a method 510 of encoding and storing governance information on-chain, according to example embodiments. For example, the method 510 may be performed by a blockchain node such as a blockchain network operator, or other admin. Referring to FIG. 5A, in 511, the method may include generating a data block for a hash-linked chain of blocks stored on a distributed ledger and accessible to a plurality of computing nodes of a blockchain network. The data block may include a genesis block (i.e., block 0) for a blockchain. In 512, the method may include storing governance policies within the generated data block. For example, the governance polices may govern interaction of nodes that are members of the blockchain with respect to transacting and storing data on the blockchain. The generated data block may include a header structure, a data structure, and a metadata structure, and the governance policies may be encoded within the data structure of the data block. The encoding may convert characters of the encoding policies into different characters/form to enable privacy and security of the data. Each governance policy encoded within the generated data block may include a policy name, policy data, and a reference to a modification policy which governs modifications to the respective governance policy.

In 513, the method may include transmitting the generated data block with the stored governance policies therein to a plurality of peer nodes of the distributed ledger. For example, the transmitted data block may be a genesis block that enables the peer nodes to accept the governance policies and join the blockchain. After joining the blockchain, the peer nodes must obey the governance policies or they will have an inconsistent state with the rest of the nodes on the blockchain network and will not be able to craft and submit valid transactions. In some embodiments, the method may further include storing the generated data block with the encoded governance policies within the blockchain on the distributed ledger.

As a non-limiting example, the governance policies encoded within the generated data block may govern one or more of a block size, a block hashing algorithm, and a block batch timeout for the hash-linked chain of blocks. In some embodiments, the governance policies encoded within the generated data block may govern authorities of different nodes of the blockchain network with respect to the hash-linked chain of blocks. In some embodiments, the governance policies encoded within the generated data block may govern one or more of a consensus type and parameters of a consensus model for the hash-linked chain of blocks. As another example, the governance policies encoded within the generated data block may govern how a new member is added to a list of members capable of accessing the hash-linked chain of blocks.

FIG. 5B illustrates a method 520 for verifying a blockchain transaction satisfies on-chain governance policies, according to example embodiments. For example, the method 520 may be performed by a peer node on a blockchain. Referring to FIG. 5B, in 521, the method may include receiving a request (e.g., blockchain transaction request) to commit a blockchain transaction to a hash-linked chain of blocks stored on a distributed ledger. For example, the request may include a transaction modifying an asset stored on the blockchain.

In 522, the method may include extracting governance policies which are encoded within a data block of the hash-linked chain of blocks on the distributed ledger. For example, the governance policies may be encoded within a genesis block of a blockchain. As another example, the governance policies may be modifications to the governance policies stored in the genesis block and which are stored in a subsequent block of the blockchain. The most up-to-date version of the governance policies may be stored in a world state database of the distributed ledger. In some embodiments, the extracting may include decoding the encoded governance policies of the distributed ledger from a data section of the data block.

In 523, the method may include determining if the blockchain request satisfies the extracted governance policies of the hash-linked chain of blocks stored on the distributed ledger. For example, the peer node may verify one or more of a block size, parties to the transaction, consensus performed, and the like, of the transaction satisfy governance policies of the blockchain which are stored therein. In response to the blockchain request satisfying the extracted governance policies, in 524 the method may include executing the blockchain request and storing the executed blockchain request within another data block of the hash-linked chain of data blocks on the distributed ledger.

In some embodiments, the determining may include determining whether a blockchain node that submitted the blockchain request is allowed to perform the blockchain request based on the extracted governance policies. In some embodiments, the method may further include receiving an indication of a consensus being satisfied for the blockchain request, and storing the blockchain request on the distributed ledger in response to the consensus being satisfied. In this example, the determining may further include determining whether the consensus satisfies one or more of a consensus type and parameters of a consensus model for the hash-linked chain of blocks based on the extracted governance policies. In some embodiments, the storing of the executed blockchain request is stored in a data block having a size based on the extracted governance policies. As another example, the storing of the executed blockchain request further comprises hashing information of the executed blockchain request based on a hashing algorithm identified from the extracted governance policies.

FIG. 5C illustrates a method 530 of modifying governance information stored on-chain, according to example embodiments. For example, the method 530 may be performed by a peer node, an ordering node that interacts with the peer node, a combination of nodes, and the like, within the blockchain network and which have access to a distributed ledger storing the blockchain. In 531, the method may include receiving a request to implement a modification to previously established governance policies of a blockchain. For example, the request may include a request to change, add, and/or delete a governance policy with respect to governance policies previously established for the blockchain. The request may be received locally via an input on a peer node, externally from a client user, or the like.

Each governance policy may have a signature requirement which is needed to satisfy a blockchain endorsement protocol. In 532, the method may include identifying one or more requirements for the modification based on the blockchain including one or more signature requirements. The signature requirements may be stored on-chain within a data block (e.g., genesis block, a subsequent block, etc.) a world state database, etc., which are stored on the distributed ledger. In some embodiments, the blockchain node may solicit the signatures needed for satisfying the requirements of the modification. Here, in 533 the method may include determining whether the one or more identified requirements are satisfied based on signature data included within the request. For example, the peer node may verify the signatures needed are received.

In response, in 534, the peer node may submit the signature information and the modification to the ordering node for approval. When the ordering node receives the modification request, the ordering node may verify the signature data, store the modification as a transaction in a data block, and broadcast the data block to the peer nodes of the blockchain. When the modification is received by the peer nodes of the blockchain, each peer node may again verify the signatures and commit the block including the modification to the governance policies to the blockchain. The storage of the modification may cause the modification to be implemented and applied going forward such that any future transaction must adhere to the modified governance policies.

In some embodiments, the one or more requirements may include an identification of a group of blockchain nodes that must provide a signature before the requested modification can be implemented. In some embodiments, the one or more requirements may be identified based on a reference to a previously established governance policy which is stored within a data block of the blockchain. In some embodiments, the determining may include building a set of changes to the previously established governance policies by the requested modification and compiling a set of corresponding modification policies which must be satisfied to authorize the set of changes. The changes may sent to the ordering node as a package.

In some embodiments, the modification to the previously established governance policies may include one or more of a change in block size, a change in a block hashing algorithm, and a change in a block batch timeout of the blockchain. In some embodiments, the modification to the previously established governance policies may include changing an ability of a blockchain peer to one or more of transact on the blockchain and read block data from the blockchain. In some embodiments, the modification to the previously established governance policies may include deleting a previously established governance policy. In some embodiments, the modification to the previously established governance policies may include adding a new governance policy to the previously established governance policies.

FIG. 5D illustrates a method 540 of determining a signature policy from a graph data structure, according to example embodiments. For example, the method 540 may be performed by a peer node, an ordering node that interacts with the peer node, a combination of nodes, and the like, within the blockchain network and which have access to a distributed ledger storing the blockchain. In 541, the method may include receiving a request to modify a governance policy of a blockchain. For example, the request may be received via a local input, a client request transmitted via the network, or the like. In 542, the method may include identifying a principal identity that controls the governance policy. For example, the node may determine which nodes must sign (endorse) the modification to the governance policy based on a modification reference stored within governance policies on-chain. The modification reference may point to a position on a graph data structure storing signature policy requirements for a group of principal identities that interact with the blockchain such as peer node users, groups, admins, orderers, certificate authority, channel, and the like.

In 543, the method may include determining an allowable combination of signatures of the principal identity required for modifying the governance policy based on the graph data structure storing signature policies for endorsing modifications to governance policies, and in 544, modifying the governance policy of the blockchain based on the request in response to an allowable combination of signatures being received. In some cases, the allowable combination may include a quorum (more than 50% of available nodes in a group, etc.). As another example, the allowable combination may include a node or a group of nodes that must sign. As another example, the allowable combination may include "N out of M" nodes where N is less than or equal to M. In some embodiments, the method may further include reading the graph data structure from a data block stored in a hash-linked chain of blocks on the blockchain.

According to various embodiments, the graph data structure may include a directed acyclic graph in which the group of principal identities of the blockchain are mapped to a group of nodes arranged in a tree structure. In some embodiments, the tree structure may include a hierarchical and recursive structure in which nodes closer to the root of the tree structure require greater signature agreement than nodes farther from the root of the tree structure. For example, a parent node in the tree structure may represent a signature policy that requires a signature policy represented by a child node to be satisfied. In some embodiments, the principal identities may include one or more of a certificate, a member, an administrator, and an organization unit. In some embodiments, the request to modify the governance policy may include one or more of a request to change a block size, a request to change a block hashing algorithm, a request to change a block batch timeout of the blockchain, a request to change how new blockchain members are added, and a request to change an ability of a blockchain peer to transact on the blockchain.

Figure 5E:
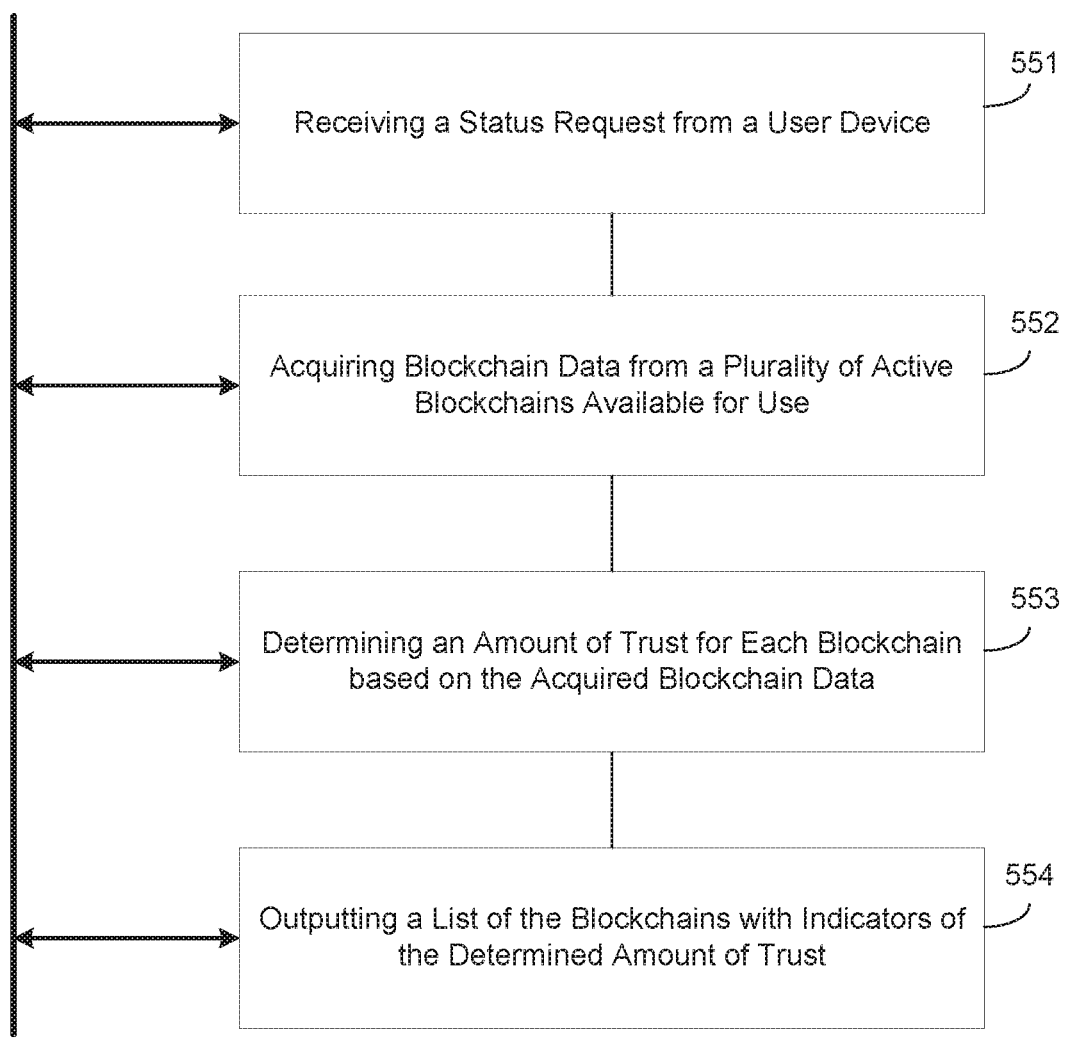
FIG. 5E is a diagram illustrating a method for generating a blockchain trust rating, according to example embodiments.

FIG. 5E illustrates a method 550 for generating a blockchain trust rating, according to example embodiments. For example, the method 550 may be performed by an inspector, or the like, which has access to blockchain information of multiple different blockchain networks. In 551, the method may include receiving a request for blockchain information from a user device. The request may include a button being pressed via a user interface for blockchain information. In 552, the method may include acquiring blockchain data from a plurality of blockchains which are actively operating and available for joining. For example, the acquired blockchain data may include one or more of location diversity of nodes of the respective blockchain, certificate identity information of nodes of the respective blockchain, node deployment information, chain code deployment information, and an amount of member nodes of the respective blockchain. In some embodiments, the acquired blockchain data may include governance policy information encoded within a data block of the respective blockchain.

In 553, the method may include determining an amount of trust for each blockchain among the plurality of blockchains based on acquired blockchain data of the respective blockchain. In 554, the method may include outputting a list identifying the plurality of blockchains where the identification of each blockchain on the list includes a trust indicator indicating a determined amount of trust for the respective blockchain. In some embodiments, the outputting may include arranging that plurality of blockchains on the list such that a blockchain with a greatest determined amount of trust is highest on the list. As an example, the status indicator indicating the determined amount of trust for a respective blockchain may include a slidable scale between a lowest possible amount of trust to a highest possible amount of trust. Here, the scale may be positioned anywhere between the highest amount of trust and the lowest amount of trust providing a ranging scale of trust ratings.

In some embodiments, the outputting may further include outputting a suggestion indicating whether or not to transact on a respective blockchain. In some embodiments, the outputting may further include outputting a notification of additional criteria that must be performed before the user device can join a respective blockchain. In some embodiments, the method may further include disabling access to a respective blockchain that has a determined amount of trust below a predetermined threshold.

Figure 6A:
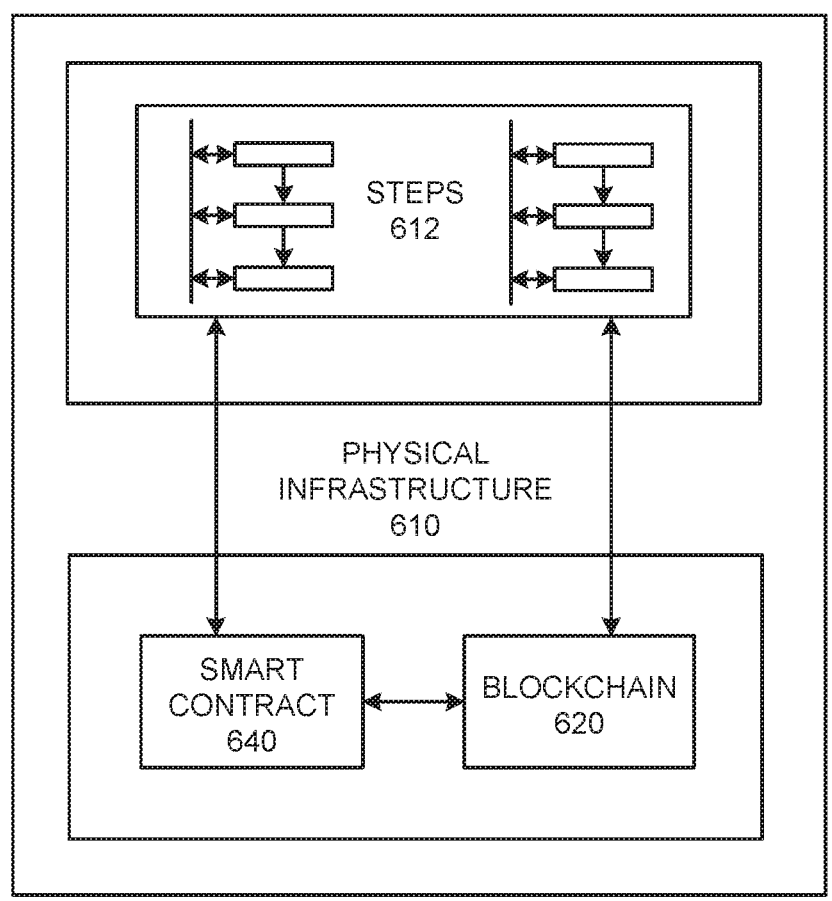
FIG. 6A is a diagram illustrating a physical infrastructure configured to perform various operations on a blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams such as shown in the examples of FIGS. 5A-5E. The steps may represent output or written information (e.g., governance policy information, signature policy information, etc.) which is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction. According to various embodiments, the smart contract 640 may be designed and executed according to the governance policies stored on-chain as described herein.

Figure 7A:
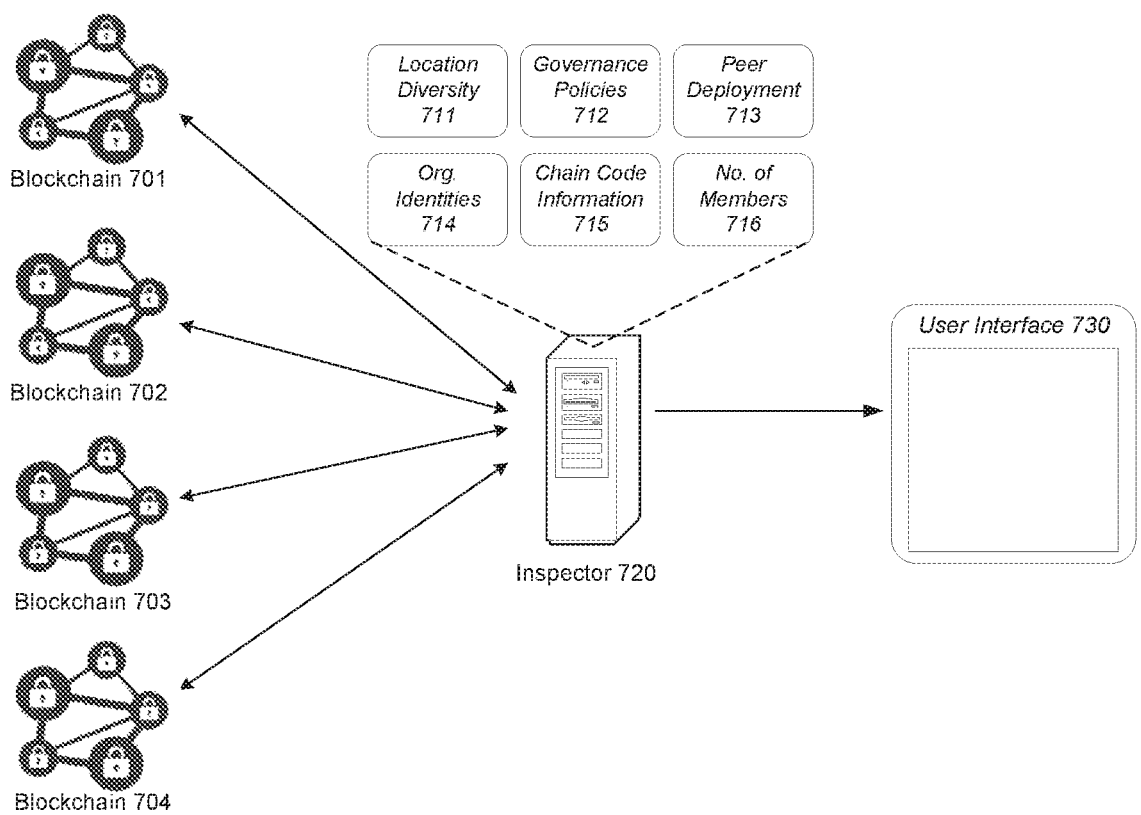
FIG. 7A is a diagram illustrating a system for determining trust information of blockchains according to example embodiments.
Figure 7B:
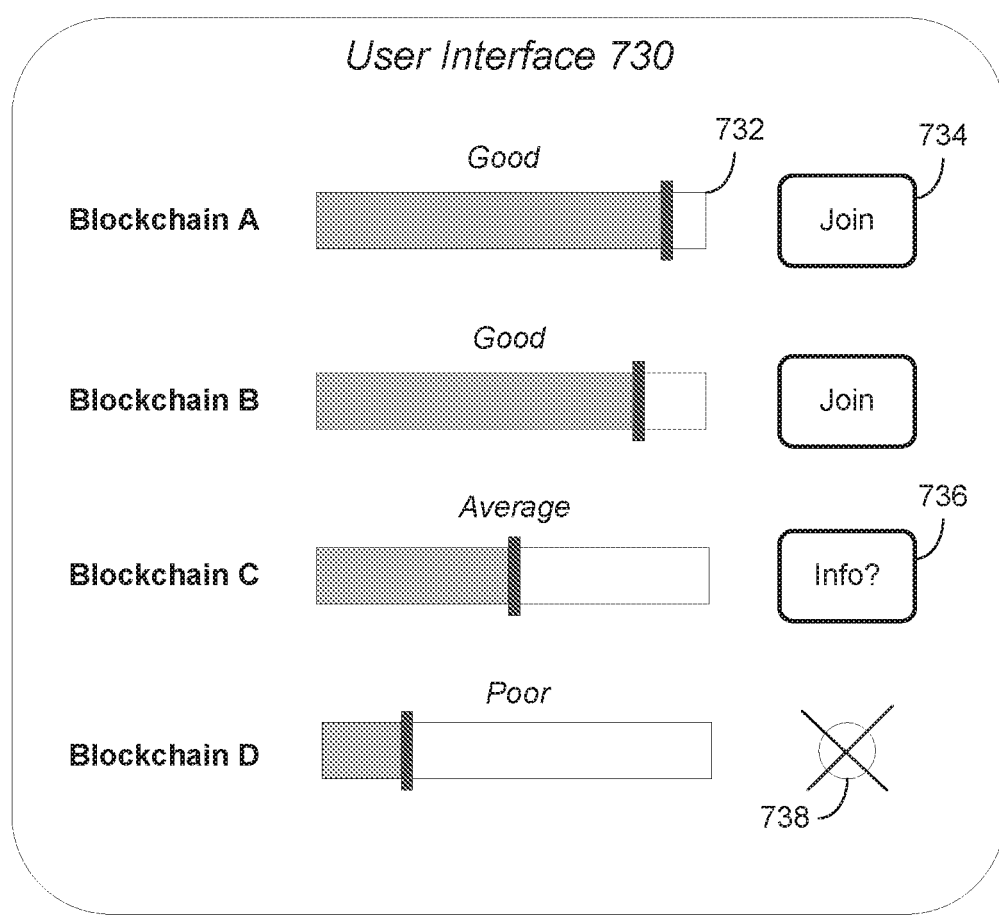
FIG. 7B is a diagram illustrating a user interface outputting a trust indicator for blockchains according to example embodiments.

FIG. 7A illustrates an inspector system 720 for determining trust information of blockchains according to example embodiments, and FIG. 7B illustrates a user interface 730 outputting a trust indicator for blockchains according to example embodiments. Referring to FIGS. 7A and 7B, the inspector 720 may receive or otherwise monitor blockchain activity among a plurality of different blockchains 701, 702, 703, and 704. Through a number of different attributes of the blockchains 701-704 and the networks operating the blockchains 701-704, a trust rating can be determined which indicates a trustworthiness of a blockchain. Furthermore, a trust indicator 732 of the amount of trust can be displayed via a user interface 730 which provides a dynamically modifiable slidable scale indicating the trustworthiness of the blockchain. In some embodiments, the user interface 730 may also display a rating (e.g., high, low, poor, good, average, etc.) and provide buttons 734 for efficiently joining a blockchain. In some embodiments, a button 736 may be used to provide additional information about criteria to be performed before a blockchain can be joined. As another example, the ability to join a blockchain may be disabled 738.

The Blockchain as a Service user interface (UI) gives founders the ability to easily invite multiple participants to the blockchain. However, founders or groups of members of the network can stipulate certain conditions on the network members. Based on the members, the conditions, the transaction history of the blockchain, an amount of trust can be identified from the blockchain and output to a user interface to provide users with the ability to determine whether to transact on a blockchain, whether to take steps together with other members to improve their blockchain, whether to set guidelines in place or criteria to be met for joining a blockchain, and the like. In some embodiments, the information can be output to the user via the user interface 730.

According to various embodiments, the inspector 720 may monitor and receive data from blockchain networks and determine a blockchain trust rating strength score based on one or more attributes of the blockchain such as location diversity 711, governance rules 712, member peer deployment 713, organizational identities 714, rules of chain code deployment, number of members on the blockchain network, and the like. Based on this information, the inspector 720 can decide which blockchain networks are safe and which blockchains are a risk. Furthermore, the inspector 720 may output the trust rating score via the slidable indicator 732 which indicates the trustworthiness of a blockchain. The trust information can enable a user to make a decision as to whether to join a blockchain. Also, in some cases, the inspector 720 may provide additional criteria 736 which can describe ways to improve the network trust rating score and/or criteria that must be met before the user can join the blockchain based on determinations made by the inspector 720. In some embodiments, the inspector 720 can even disable access 738 to a blockchain when the blockchain receives a trust rating score that is below a predetermined threshold.

The network trust rating score may be delivered via a slider scale 732. The inspector 720 may rely on a rich set of criteria to compute the network trust rating score. As a non-limiting example, criteria that may be used to determine a network's trust rating include network location diversity 711, rules of governance enforced 712, member peer deployment 713, organizations with attested identities 714, rules of chain code deployment 715, number of members in a blockchain network 716, and the like.

Blockchain is a shared distributed ledger. When determining location diversity 711 for permissioned networks the inspector 720 may ensure that the nodes are truly distributed. For example, the inspector 720 may ensure that a high availability of each node is on a separate data center and the nodes are globally distributed based on the origin of network member. Regarding the governance information 712, each permissioned blockchain should be guided by rules of governance that the network founders and members agree to and sign off on. The inspector 720 may identify different categories of rules of governance enforcement to determine the network trust rating for instance more stringent governance rules are given a higher network trust score while loose governance rules (for instance any member can add or remove members) gets a lower network trust score.

Regarding the member peer deployment 713, deployment of peers on a blockchain enables the network trust rating to increase because it can guarantee integrated hardware security module (HSM) with highest Federal Information Processing Standards (FIPS) compliance, locked down appliance with no privileged access and secure boot sequence for tamper evident detection. Regarding the organizational identities 714, members may join the network and generate certificate's that they use to transact on the network. The certificates associate the identity of the member with a cryptographic key. An identity attestation authority can validate and attest the identities of participating members thereby ensuring greater trust in the network.

Regarding the rules of chain code deployment 715, members participating in a network also need to agree to and sign off on the rules of chain code deployment. Signing off on these rules is taking into account while computing the network trust rating. In addition, trust of a distributed ledger is increased with an increased number of members for a particular network. Accordingly, the inspector 720 may take into account members 716 of a particular network while computing network trust rating. Based on these factors, the inspector 720 may compute a network trust rating that enables members and founders to take various actions based on that rating. The factors that are taken into account can be adjusted and the network trust rating algorithm can be optimized as the blockchain technology evolves. Furthermore, in some cases, actions available to a user/business via a user interface 730 may be adjusted based on the determined network trust ratings.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module.

Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a network interface configured to receive a request to commit a blockchain request to a distributed ledger; and
   a processor configured to extract governance policies from a data block previously stored on a blockchain on the distributed ledger, where the governance policies have been previously agreed to by a plurality of blockchain peers that store the blockchain, determine if the blockchain request satisfies the extracted governance policies, and, in response to successful satisfaction of the extracted governance policies, execute and store the blockchain request within another data block of blockchain.

2. The computing system of claim 1, wherein the processor extracts the governance policies from a genesis data block of the blockchain.

3. The computing system of claim 1, wherein the processor is configured to determine whether a blockchain node that submitted the blockchain request is allowed to perform the blockchain request based on the extracted governance policies.

4. The computing system of claim 1, wherein the processor is further configured to receive an indication of a successful consensus for the blockchain request, and store the blockchain request on the blockchain in response to a successful consensus.

5. The computing system of claim 4, wherein the processor is further configured to determine whether the consensus satisfies one or more of a consensus type and parameters of a consensus model for the blockchain specified by the extracted governance policies.

6. The computing system of claim 1, wherein the processor is further configured to decode the encoded governance policies of the distributed ledger from a data section of the data block.

7. The computing system of claim 1, wherein the extracted governance policies specify a maximum block size allowed by the blockchain.

8. The computing system of claim 1, wherein the extracted governance policies specify a hash algorithm to be used for hashing the blockchain request when storing the blockchain request on the blockchain.

9. A method comprising:
receiving a request to commit a blockchain request to a distributed ledger;
extracting governance policies from a data block previously stored on a blockchain on the distributed ledger, where the governance policies have been previously agreed to by a plurality of blockchain peers that store the blockchain;
determining if the blockchain request satisfies the extracted governance policies; and
in response to the blockchain request satisfying the extracted governance policies, executing and storing the blockchain request within another data block of the blockchain.

10. The method of claim 9, wherein the extracting comprises extracting the governance policies from a genesis data block of the blockchain.

11. The method of claim 9, wherein the determining comprises determining whether a blockchain node that submitted the blockchain request is allowed to perform the blockchain request based on the extracted governance policies.

12. The method of claim 9, further comprising receiving an indication of a consensus being satisfied for the blockchain request, and storing the blockchain request on the blockchain in response to the consensus being satisfied.

13. The method of claim 12, wherein the determining further comprises determining whether the consensus satisfies one or more of a consensus type and parameters of a consensus model for the blockchain specified by the extracted governance policies.

14. The method of claim 9, wherein the extracting comprises decoding the encoded governance policies of the distributed ledger from a data section of the data block.

15. The method of claim 9, wherein the extracted governance policies specify a maximum block size allowed by the blockchain.

16. The method of claim 9, wherein the extracted governance policies specify a hashing algorithm to be used for hashing the blockchain request when storing the blockchain request on the blockchain.

17. A non-transitory computer readable medium comprising instructions, that when read by a processor, cause the processor to perform a method comprising:
receiving a request to commit a blockchain request to a distributed ledger;
extracting governance policies from a data block previously stored on a blockchain on the distributed ledger, where the governance policies have been previously agreed to by a plurality of blockchain peers that store the blockchain;
determining if the blockchain request satisfies the extracted governance policies; and
in response to the blockchain request satisfying the extracted governance policies, executing and storing the blockchain request within another data block of blockchain.

18. The non-transitory computer readable medium of claim 17, wherein the extracting comprises extracting the governance policies from a genesis data block of the blockchain.

19. The non-transitory computer readable medium of claim 17, wherein the determining comprises determining whether a blockchain node that submitted the blockchain request is allowed to perform the blockchain request based on the extracted governance policies.

20. The non-transitory computer readable medium of claim 17, wherein the method further comprises receiving an indication of a consensus being satisfied for the blockchain request, and storing the blockchain request on the blockchain in response to the consensus being satisfied.

* * * * *